(12) United States Patent
Wagner et al.

(10) Patent No.: US 10,403,464 B2
(45) Date of Patent: Sep. 3, 2019

(54) 3D PRINTED MICRO CHANNEL PLATE, METHOD OF MAKING AND USING 3D PRINTED MICRO CHANNEL PLATE

(71) Applicants: Robert G. Wagner, Bolingbrook, IL (US); Michael J. Pellin, Naperville, IL (US); Howard Nicholson, South Hadley, MA (US); Lei Xia, Chicago, IL (US); Jingbo Wang, Willowbrook, IL (US); Junqi Xie, Naperville, IL (US); Anil U. Mane, Naperville, IL (US); Jeffrey W. Elam, Elmhurst, IL (US)

(72) Inventors: Robert G. Wagner, Bolingbrook, IL (US); Michael J. Pellin, Naperville, IL (US); Howard Nicholson, South Hadley, MA (US); Lei Xia, Chicago, IL (US); Jingbo Wang, Willowbrook, IL (US); Junqi Xie, Naperville, IL (US); Anil U. Mane, Naperville, IL (US); Jeffrey W. Elam, Elmhurst, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 0 days.

(21) Appl. No.: 15/718,407

(22) Filed: Sep. 28, 2017

(65) Prior Publication Data
US 2019/0096623 A1   Mar. 28, 2019

(51) Int. Cl.
| | |
|---|---|
| *B29C 64/135* | (2017.01) |
| *H01J 1/32* | (2006.01) |
| *B29C 64/268* | (2017.01) |
| *B33Y 10/00* | (2015.01) |
| *H01J 9/12* | (2006.01) |

(52) U.S. Cl.
CPC .............. *H01J 1/32* (2013.01); *B29C 64/135* (2017.08); *B29C 64/268* (2017.08); *B33Y 10/00* (2014.12); *H01J 9/125* (2013.01)

(58) Field of Classification Search
CPC ...... B29C 64/268; B29C 64/135; B33Y 10/00
USPC ................................................. 313/103 CM
See application file for complete search history.

(56) References Cited

U.S. PATENT DOCUMENTS

| | | | | |
|---|---|---|---|---|
| 4,737,013 | A * | 4/1988 | Wilcox ................... | C03B 37/15 385/120 |
| 9,082,907 | B2 | 7/2015 | Feller et al. | |
| 9,139,905 | B2 | 9/2015 | Elam et al. | |
| 9,899,201 | B1 * | 2/2018 | Park ...................... | H01J 49/025 |
| 2003/0090034 | A1 * | 5/2003 | Mulhaupt ............. | B29C 31/045 264/255 |
| 2015/0251360 | A1 * | 9/2015 | Steele ..................... | B33Y 10/00 264/308 |
| 2019/0066961 | A1 * | 2/2019 | Mane ..................... | H01J 43/246 |

FOREIGN PATENT DOCUMENTS

CN            20480955 U    * 12/2015

* cited by examiner

*Primary Examiner* — Christopher M Raabe
(74) *Attorney, Agent, or Firm* — Cherskov Flaynik & Gurda, LLC

(57) ABSTRACT

The invention provides a gain device having a plurality of channels having a polygonal shape with four or more sides. The invention also provides a method for producing microchannel plates (MCPs) having the steps of providing a pre-polymer; and directing a laser over the pre-polymer into a pre-determined pattern. Also provided is method for efficiently 3D printing an object.

8 Claims, 24 Drawing Sheets

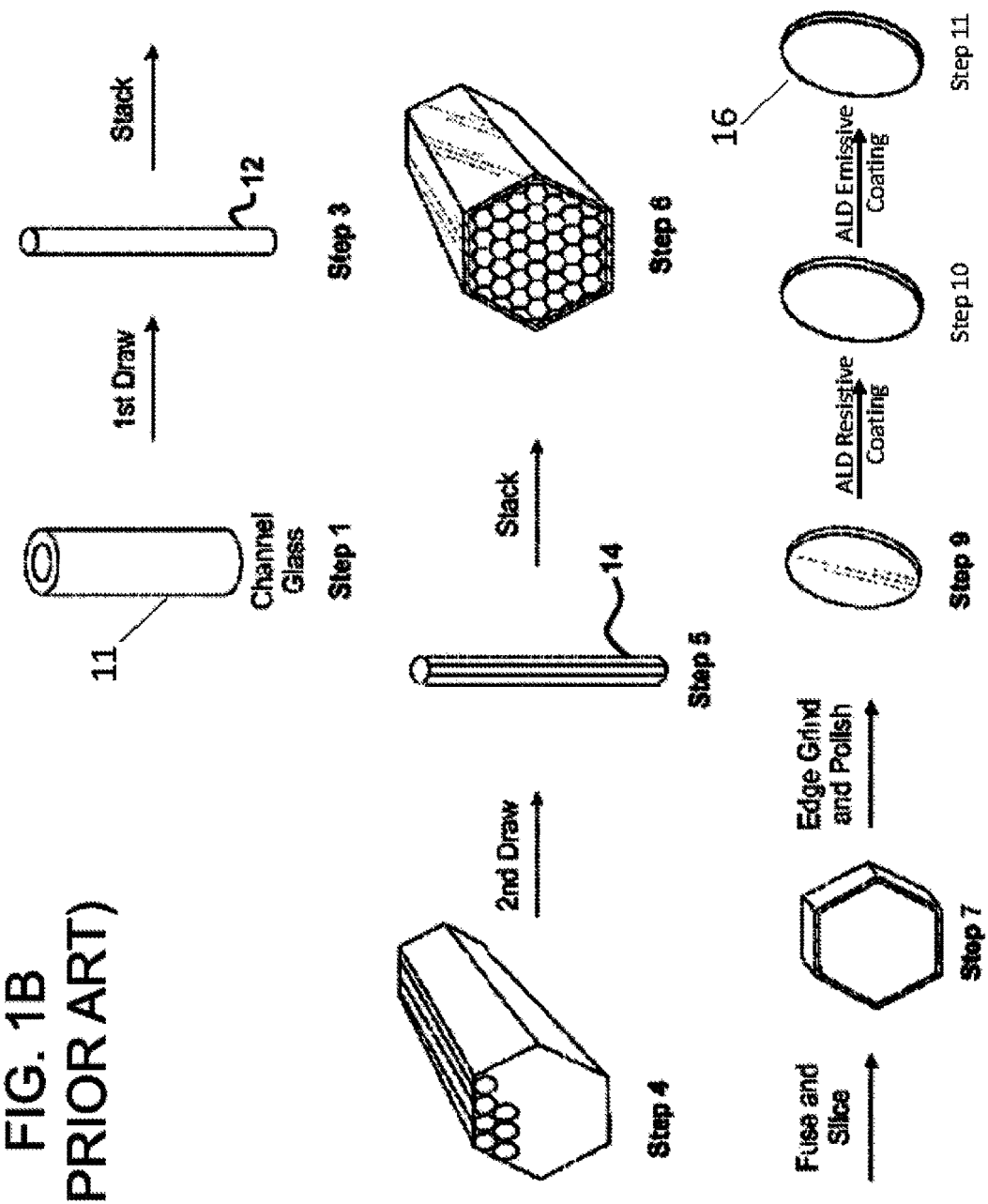

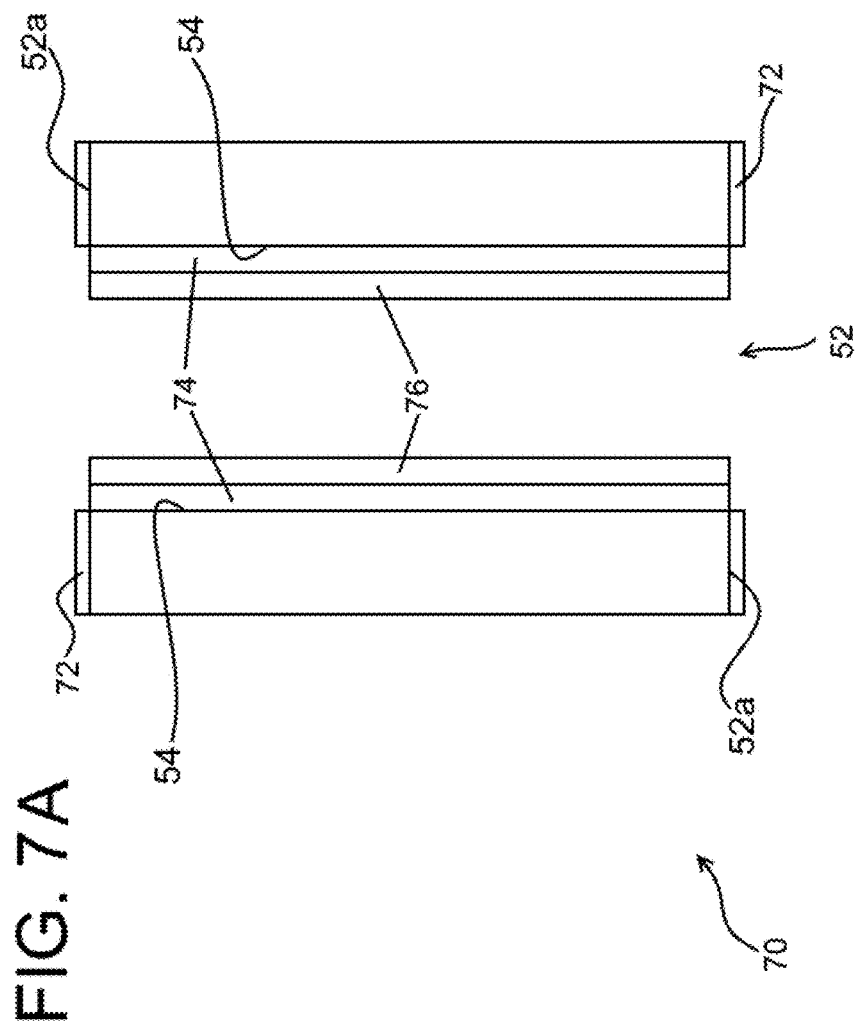

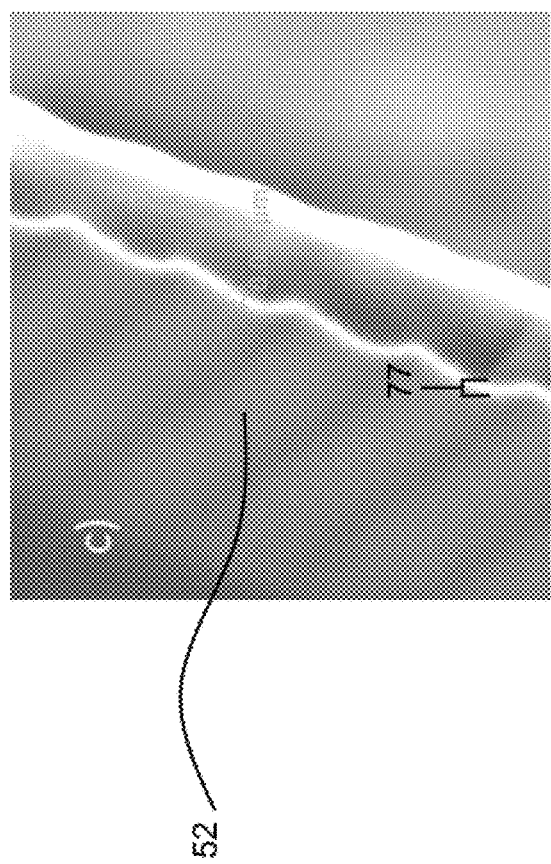

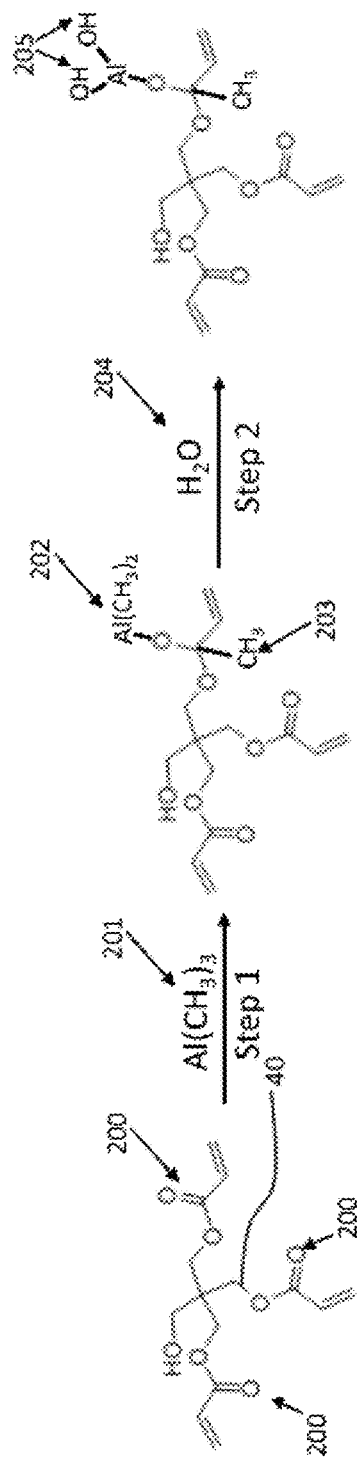

3D PRINTED MICRO CHANNEL PLATE, METHOD OF MAKING AND USING 3D PRINTED MICRO CHANNEL PLATE

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to micro capillary arrays and more specifically, this invention relates to a method of 3D printing microchannel plates for various uses, where 3D printing greatly decreases the time needed to produce the arrays and reduces the cost of same versus state of the art microchannel plates.

2. Background of the Invention

Microchannel Plates (MCPs) are plates defining regular, parallel arrays of microscopic channels. These channels are normally cylindrical and pass through the entire thickness of the plate. Standard MCPs are made from glass.

The classic use of an MCP is as an electron multiplier. In use as an electron multiplier a voltage is applied along the length of each channel. Each channel is coated with a suitable tunable resistive layer and an electron emissive layer. With this configuration, an electron that collides with the wall of a channel will produce several more electrons which will then produce several more electrons when those electrons collide with the wall of a channel. In this way, MCPs can be used in the same way as classic electron multiplier devices. Furthermore, the MCP can amplify a pattern of electrons incident on the front surface because each pore acts independently. In a classic electron multiplier configuration, MCPs are useful in devices designed to multiply incident energy such as night vision devices. MCPs may further be used as a sieve to separate $^3$He and $^4$He, filters to trap viruses in the air, as a template for the parallel synthesis of microtubes or microwires, and membranes for water purification.

With modification, standard MCPs can serve as neutron detectors. In such a configuration, the material comprising the channels is modified to release multipliable and detectable moieties upon incidence of a neutron. For example, traditional glass MCPs can be doped with $^{10}$B that, upon incidence with a neutron, release a $^7$Li particle, an alpha particle, and gamma radiation. When the alpha reaches a channel of an MCP and produces one or more electrons, the channels act as classic electron multipliers so that each electron produced after a neutron collision is multiplied into many electrons and a detectable number of electrons reach a detector at the bottom of the channels.

State of the art MCPs, as referenced above, are made from glass as described in U.S. Pat. No. 9,082,907. The process for making prior art MCPs is a complicated series of steps involving glass melting, molding, extruding, etching, and packing individually created channels into a form. Such a process is a time and effort intensive process requiring the input of experienced artisans. As such, MCPs made by this method cost between ~$50-$200/cm$^2$. These costs are prohibitive in many cases, leaving the need for a more efficient, less labor intensive way to make MCPs.

3D printing is rapidly advancing and is presently becoming such a method for creating high-precision devices on-demand and without the need for highly skilled artisans. For these objectives, 3D printing is a ground-breaking tool that is readily changing the way consumer and high-precision scientific objects are made. However, 3D printing of small-scale, precision objects requires much more time than printing larger devices. For instance, it would take approximately 72 hours to print a 1 cm$^2$ MCP that is 0.15 mm thick. Moreover, the printing medium for small-scale, precision optics is a polymer that does not possess the necessary resistive and electron emissive properties for an MCP.

A need in the art exists for cheaper and more widely available MCPs. There is also a need for an economical method for producing such MCPs. The MCPs should be equally applicable to current and future scientific needs as state-of-the-art glass MCPs. And, the method for making these new MCPs should be cheap, fast, and reliable.

SUMMARY OF INVENTION

An object of the invention is to provide a method for creating MCPs that overcomes many of the disadvantages of the prior art.

Another object of the invention is to provide a method for creating MCPs that is automatic and reliable. A feature of the invention is the use of 3D printing to create MCPs. An advantage of the invention is that, once the system to carry out the 3D printing is in place, there is no need to employ a skilled artisan to assemble the invented MCPs. Another feature of the invention is that the invented 3D printing method produces MCPs that are at least one cm in diameter and 1.2 mm thick in approximately 24 hours. A combination of a rapid printing method overseen by non-skilled personnel results in cost savings and reduced prices of MCP, compared to traditional MCPs. For example, MCPs created using the instant method cost on the order of $1/cm$^2$ compared to approximately $50-$200/cm$^2$ for prior art MCPs.

Another object of the invention is to provide a method for reducing the time needed to 3D print the invented MCP. A feature of the invention is that an out-of-the box 3D printer is used in making the invented MCP that is then modified to operate more efficiently through software and designed print orders. An advantage of the invention is that the tools needed to use and the instant invention are widely available.

Still another object of the invention is to provide precision MCPs with superior qualities to state-of-the art, glass MCPs. A feature of the invention is that the created MCPs outperform glass MCPs in several respects, including open area ratio and gain. An advantage of the invention is that the produced MCPs feature open area ratios of at least 97% and gain of at least 10$^4$ for 1.2 mm thick MCPs, where the gain value increases with MCP thickness.

Yet another object of the invention is to use the invented MCPs in various devices requiring electron multiplication. A feature of the invention is that the invented MCPs can be used to multiply incoming electrons in order to detect or increase detection of various types of incident particles or energy. An advantage of the invention is that the invented MCPs are applicable to many technologies where electron multiplication is used to detect incoming radiation or particles.

Still yet another object of the invention is to use the invented MCPs as a neutron detector. A feature of the invention is the use of $^{10}B$ within the 3D printer "ink" such that the printed MCPs eject and multiply electrons upon the incidence of neutrons. An advantage of the invention is that the use of inexpensive 3D printing methods with $^{10}B$ doped "inks" results in cheap neutron detectors that are very small and can be used in the field to detect the presence of fissile materials such as uranium or plutonium.

Yet another aspect of the invention is to use atomic layer deposition (ALD) and sequential infiltration synthesis (SIS) to apply thin films on all internal and external surfaces of the 3D printed MCPs to impart resistive and secondary emissive properties. Unlike conventional capillary arrays composed of dense glass, the 3D printed polymer has intrinsic porosity due to the free volume characteristic of organic polymers. A feature of the invention is using SIS to infiltrate and seal pores in the near-surface region of printed MCPs pores so that the subsequent ALD proceeds in a controlled fashion.

Briefly, the invention provides 1 gain device comprising a plurality of channels having a polygonal shape with four or more sides.

Also provided is a method for producing microchannel plates (MCPs) comprising: providing a pre-polymer; and directing a laser over the pre-polymer into a pre-determined pattern.

Still further provided is A method for efficiently 3D printing an object comprising: a) providing a pre-polymer into a sample holder; b) directing a laser over the pre-polymer in a predetermined pattern to create a layer of an object having a height, H; c) raising the sample holder along a latitudinal axis that is parallel to the height of the object and runs through the center of the layer by a distance equal to H; d) directing the laser over the pre-polymer in the predetermined pattern; e) repeating steps a)-d) until the object has a first predetermined area and a predetermined second height; f) resetting the position of the sample holder; g) moving the sample holder along a latitudinal axis of the layer a predetermined distance; h) repeating steps a)-g) until the object has a final area; i) resetting the position of the sample holder; j) raising the sample holder along a latitudinal axis through the center of the layer by a distance of the predetermined second height plus H; and k) repeating steps a)-j) until the object has a final area and final height.

BRIEF DESCRIPTION OF DRAWING

The invention together with the above and other objects and advantages will be best understood from the following detailed description of the preferred embodiment of the invention shown in the accompanying drawings, wherein:

FIGS. 1A and 1B are schematic diagrams showing the production of prior art MCPs;

FIG. 7A depicts a cross-section of a functionalized MCP, in accordance with the features of the present invention;

FIG. 7B depicts an SEM image of a MCP channel coated using SIS and ALD, in accordance with the features of the present invention;

FIG. 7C depicts a protocol for using sequential infiltration synthesis to infiltrate pores of the MCPs, in accordance with the features of the present invention;

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a method for 3D printing micro channel plates (MCPs) and devices using the printed MCPs.

Figure 1A:
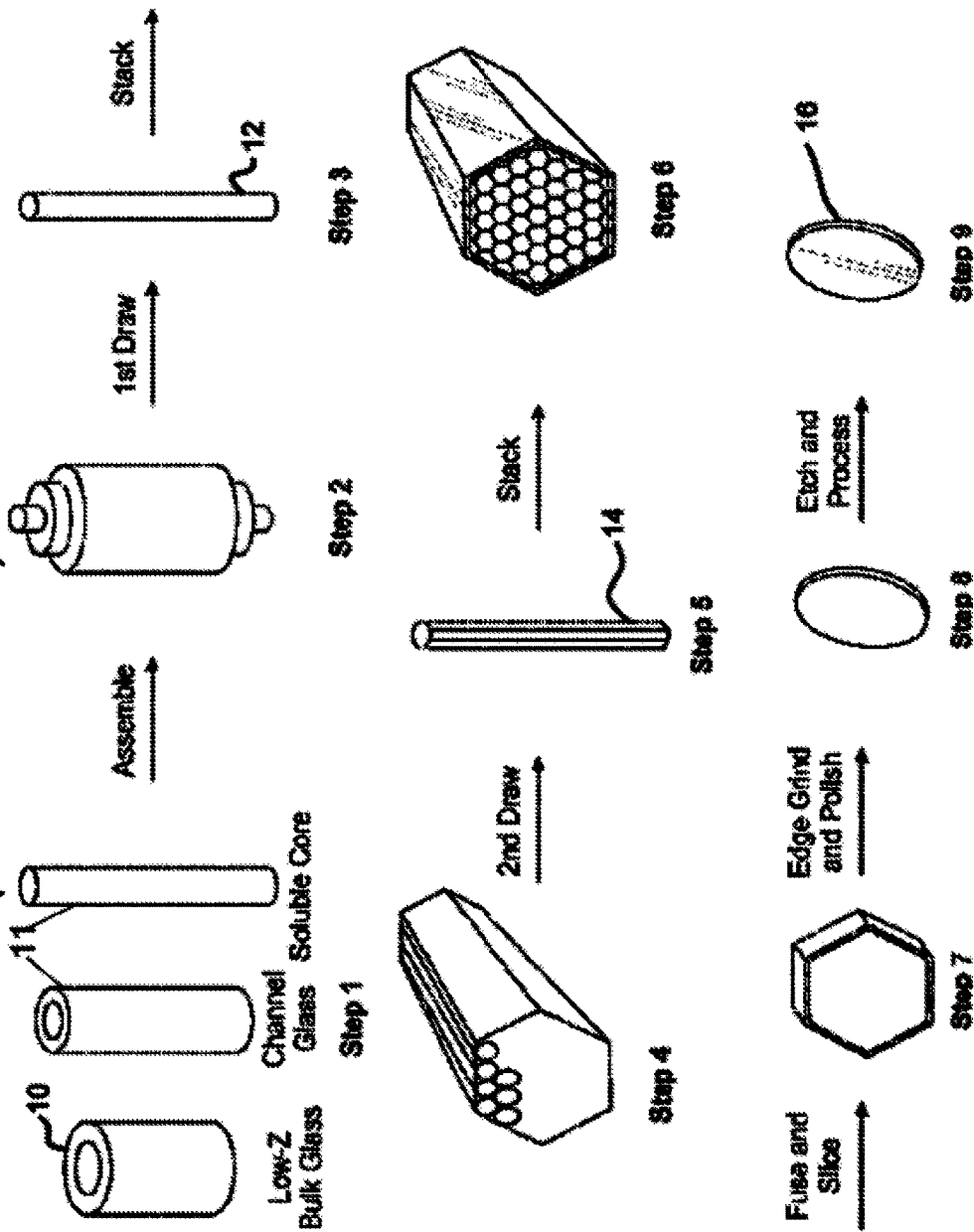

FIG. 1A is a schematic diagram showing a state of the art method for producing MCPs. A plurality of glass rods is created by nesting two types of glass 11 within a Low-Z, bulk, casing 10, and drawing the rods to be a first size rod 12. Those rods are then stacked and extruded to create smaller rods 14. Then, in a series of final steps, bundles of smaller rods 14 are then heated, sliced, etched, polished, and hydrogen fired to create final MCPs 16. The hydrogen firing step imparts both the resistive and emissive properties to the MCP surface.

FIG. 1B is a schematic diagram showing another state of the art method for producing MCPs. A plurality of hollow glass capillaries is created by drawing hollow glass tubes 11 to be a first size 12. Those capillaries are then stacked and extruded to create smaller capillaries 14. Then, in a series of final steps, bundles of smaller capillaries 14 are then heated, sliced, polished, and ALD coated to create final MCPs 16. The resistive property of the MCP is imparted by the ALD resistive coating in step 10, and the emissive property of the MCP is imparted by the ALD emissive coating in step 11. Several advantages of the MCP fabrication method shown in FIG. 1B over that in FIG. 1A are the elimination of assembling and etching steps, and the ability to independently tune the resistive and emissive properties of the MCP.

The series of steps shown in FIGS. 1A-1B are labor intensive, precise, and require a skilled artisan. As such, the process is time and labor intensive. The final MCPs created using the prior art method, therefore, cost between $50-$200 per $cm^2$.

3D Printing Detail

In place of the more difficult and time intensive state-of-the-art efforts of manufacturing MCPs, the inventors have utilized 3D printing to manufacture MCPs more quickly, with less expense, and with superior properties. Specifically, the inventors have utilized two photon polymerization of IR-curable photoresist using a single-head 3D printer. Preferably, the printer has approximately sub 0.5 µm 2D lateral resolution and approximately sub 1 µm vertical resolution. Any 3D printer capable of these parameters is suitable for use in the instant invention. Commercially available printers with these capabilities are widespread and include the micron resolution printer (Photonic Professional) from Nanoscribe GmbH, of Eggenstein-Leopoldshafen, Germany.

Figure 2:
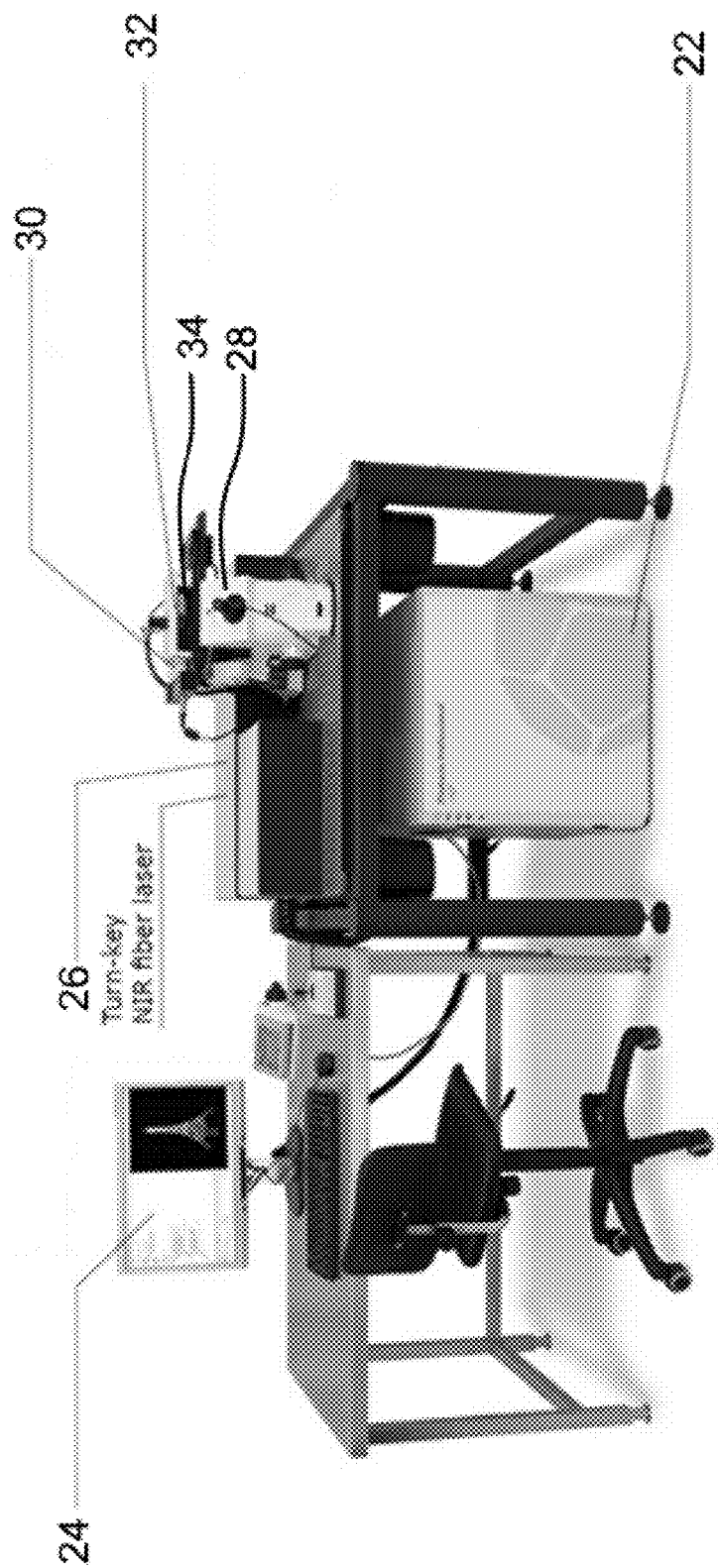
FIG. 2 depicts the 3D printer used in the instant invention, in accordance with the features of the present invention.

FIG. 2 depicts the 3D printer setup 20 as used in the instant invention. The printer setup 20 is comprised of a computer 22 that runs the printer 20. The computer is operated by a user interacting with a terminal that runs software and a user interface 24 needed to instruct the printer 20. The exemplary Nanoscribe printer comes with two programs written by the company to run the printer, Nanowrite and a compiled version of Nanowrite called Describe.

The printer 20 itself is comprised of a laser cabinet 26 (containing a laser and its necessary operating optics), a microscope 28 for providing a high resolution field of view for focusing the printer's laser, a scanning unit 30, and a positioning system 32. The scanning unit 30 comprises pivotable galvo mirrors for quick, short distance laser movements. In an embodiment, the galvo mirrors (or plates) reposition the printing laser beam very quickly ($10^6$ µm per second) and precisely in the x-y plane (parallel to the ground) over a range of approximately 250 µm. The positioning system comprises three piezoelectric stages, one to move the sample holder 34 in each of the x, y, and z directions, and a mechanical stage capable of moving the sample holder 34 in any direction (x, y, or z). The piezoelectric stages are slower than the galvo mirrors ($2 \cdot 10^2$ µm per second) but operate over a larger distance, approximately 300 µm, but move with high precision. The mechanical stage is the slowest (2 µm per second) and least precise of the three sample/laser moving apparatuses but offers the largest range of movement, 100 mm in any direction. The printer uses a continuous pulse, femtosecond laser. The Ti:Sapphire laser has a wavelength of approximately 780 nm. In an embodiment, the printer is a single head printer operating under a two photon paradigm. Alternatively, the invention can utilize any printer with sufficient resolution to make the MCPs described herein.

The speed and range of motion given for the movement apparatuses discussed above are exemplary and not meant to be limiting. Customized printers may be used in the instant invention. In these custom printers the precision of motion of the movement apparatuses are repeatable to the spatial resolution of the object being printed. For example, using the printer described above, the precision is measured to approximately 50 nm for the galvo plates and piezoelectric stage, the mechanical stage precise to approximately 100 nm. In a custom printer, precision may be improved to 50 nm on all movement apparatuses.

The printer used in the instant invention is a single head printer that operates under the 2γ (two photon) paradigm. Under the two photon principle of operation, a user provides an amorphous and non-shaped pre-polymer called photoresist to the sample holder 34 of the printer. The laser is then activated and is directed to the photoresist via the printer's software and positioning systems (galvo mirrors, piezoelectric and mechanical sample stages) in a pre-programmed series of movements to make a shape/configuration designed by a user. When a voxel of the pre-polymer absorbs two photons of IR light generated by the printer's laser, the photoresist polymerizes and hardens. (A voxel represents the smallest unit of pre-polymer.) Thus, in order to create a desired shape using the default print settings, a user programs that shape into the printer 20 setup using a user interface. The programmed shape is then made layer by layer, voxel (smallest volume of pre-polymer polymerized by two photons from the laser) by voxel, until the predetermined shape is completed.

An important feature of the invention is the improved 3D printing protocol invented by the inventors. Using a 3D printer's standard settings, the printer generates the desired object one layer at a time without concern for the distance between two subsequent sweeps of the laser or the amount of a layer that is gone over more than once by the laser. In an embodiment, the inventors have discovered a 3D printing path that leverages the relative range, precision, and speed of the three laser positioning apparatuses (galvo mirrors, piezoelectric stages, and mechanical stage) to maximize the speed of a desired 3D printing. The increase in speed is generated by eliminating essentially all non-printing motions, moving the sample as quickly and precisely as possible, and repeating minimal sweeps of the laser per layer.

Figure 3A:
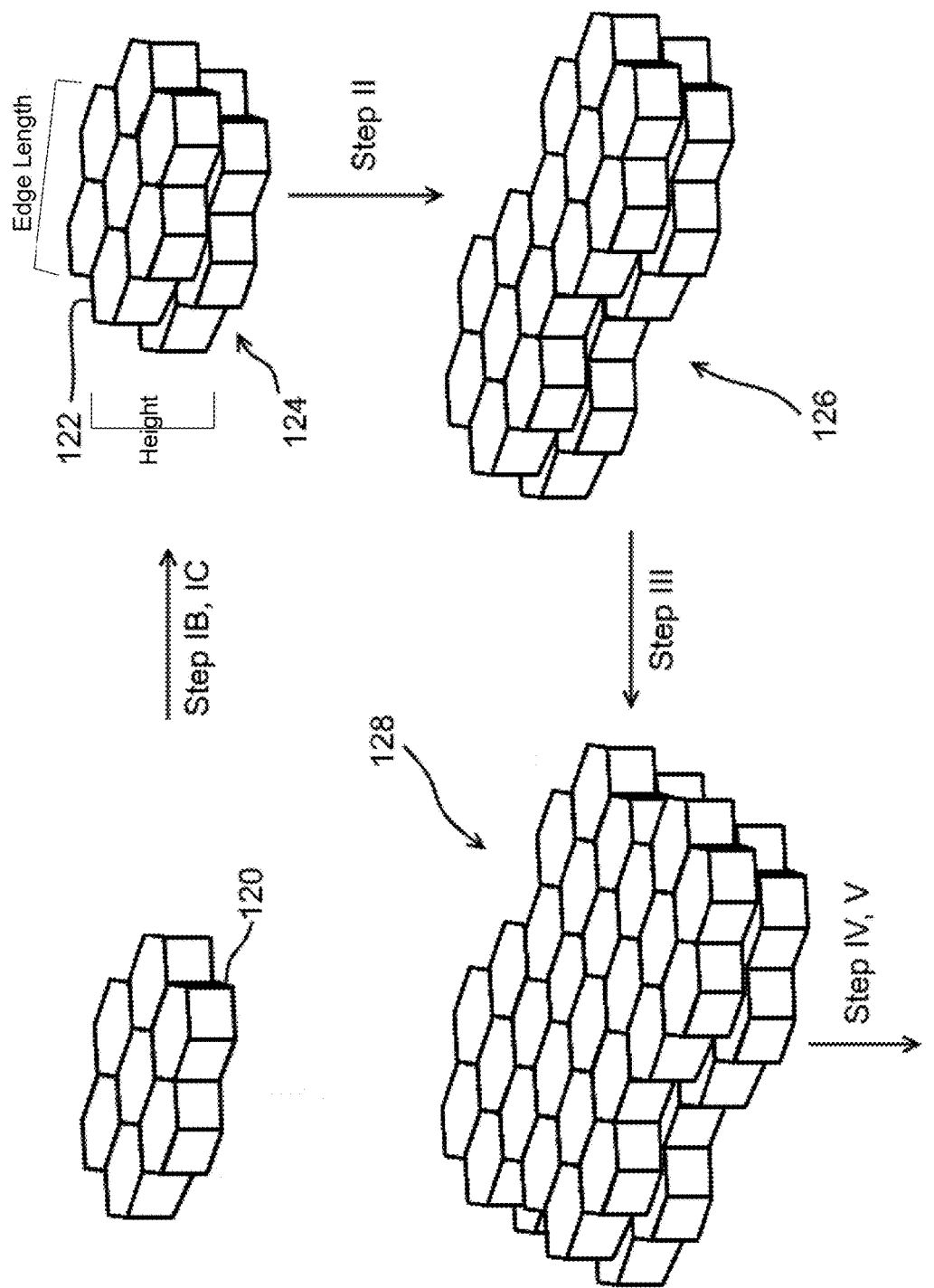
FIGS. 3A-3B show a schematic of a 3D printing protocol to print a MCP with hexagonal channels, in accordance with the features of the present invention.
Figure 3B:
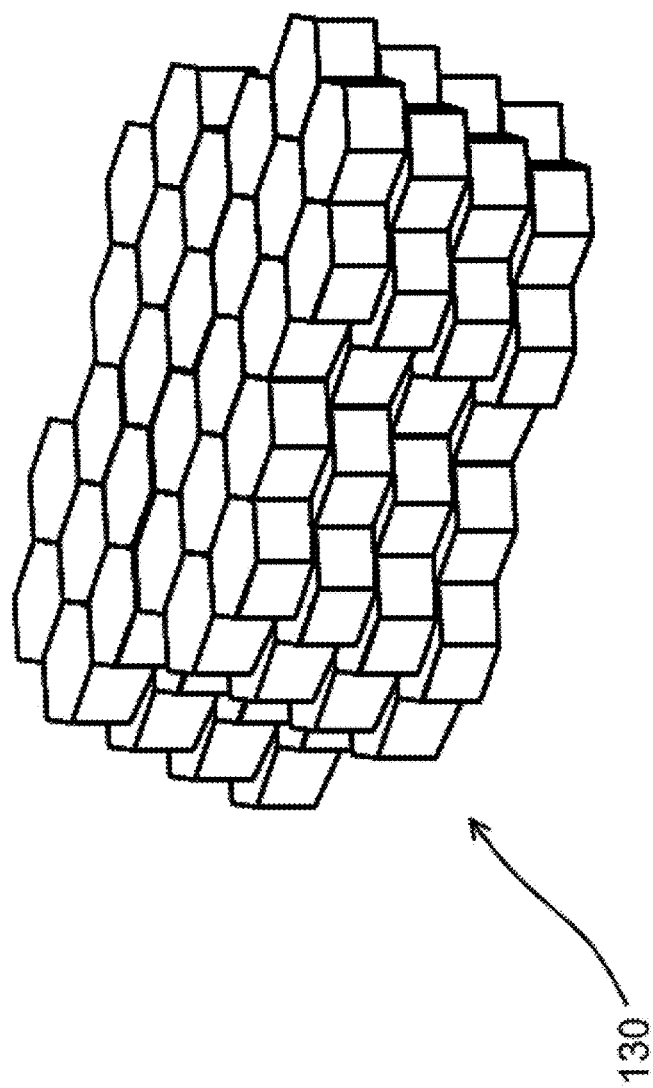

FIGS. 3A-3B show a schematic of the invented 3D printing protocol. The protocol begins by using the galvo plates to move the laser over the photo-resist prepolymer in a predetermined series of movements (a portion of the series of movements to draw the invented MCPs shown in FIG. 3C). This first step (step IA) continues building a single layer one voxel high until the range of motion of the galvo plates is exhausted, giving a first layer 120 having an area of approximately 450×450 μm². The z-direction piezoelectric stage then moves the sample holder up in the z direction by the distance of one layer (approximately 100-1000 nm), and either the x or y piezoelectric stage moves slightly in the x or y direction 40 nm to offset subsequent layers by a bias angle as discussed below (step IB). The galvo plates then move the printer's laser through the same predetermined pattern to produce a second layer 122 on top of the first (step IC). FIG. 3A shows the result 124 of the first iteration of step IB and IC. This first step is repeated a plurality of times until the developing structure has a side measuring at least 250 μm (450×450 μm² in this example) and the structure has a height of 300 μm (step ID). In practice, the first iteration of step ID is complete for the described hexagonal MCPs when the generally hexagonally shaped structure 124 has an edge length of approximately 450 μm and height of approximately 300 μm.

In the second step of the 3D printing protocol, the piezoelectric stages are all reset and the mechanical stage moves to an adjacent area to the structure already printed (Step II). Step 1 (IA-D) is then re-performed in this area until there is an additional portion of the developing structure that is 250 μm on one side with a height of 300 μm. FIG. 3A shows the result of the first iteration of step II and first repetition of steps IA-D 126.

In step 3, steps IA-D and 2 are repeated until the structure printed has the desired area and a thickness of 300 μm 128 (step III). In step 4, the position of the sample holder is reset and subsequently raised 300 nm in the z direction by the mechanical stage (step IV). Subsequently, steps IA-IV are repeated until the printed plate 130 reaches the desired thickness (step V). The dimensions given here are exemplary and reference using the above-described 3D printer to print the invented MCPs. A person having ordinary skill in the art can easily adapt the above protocol to build any structure of any dimension given a suitable printer.

Figure 3C:
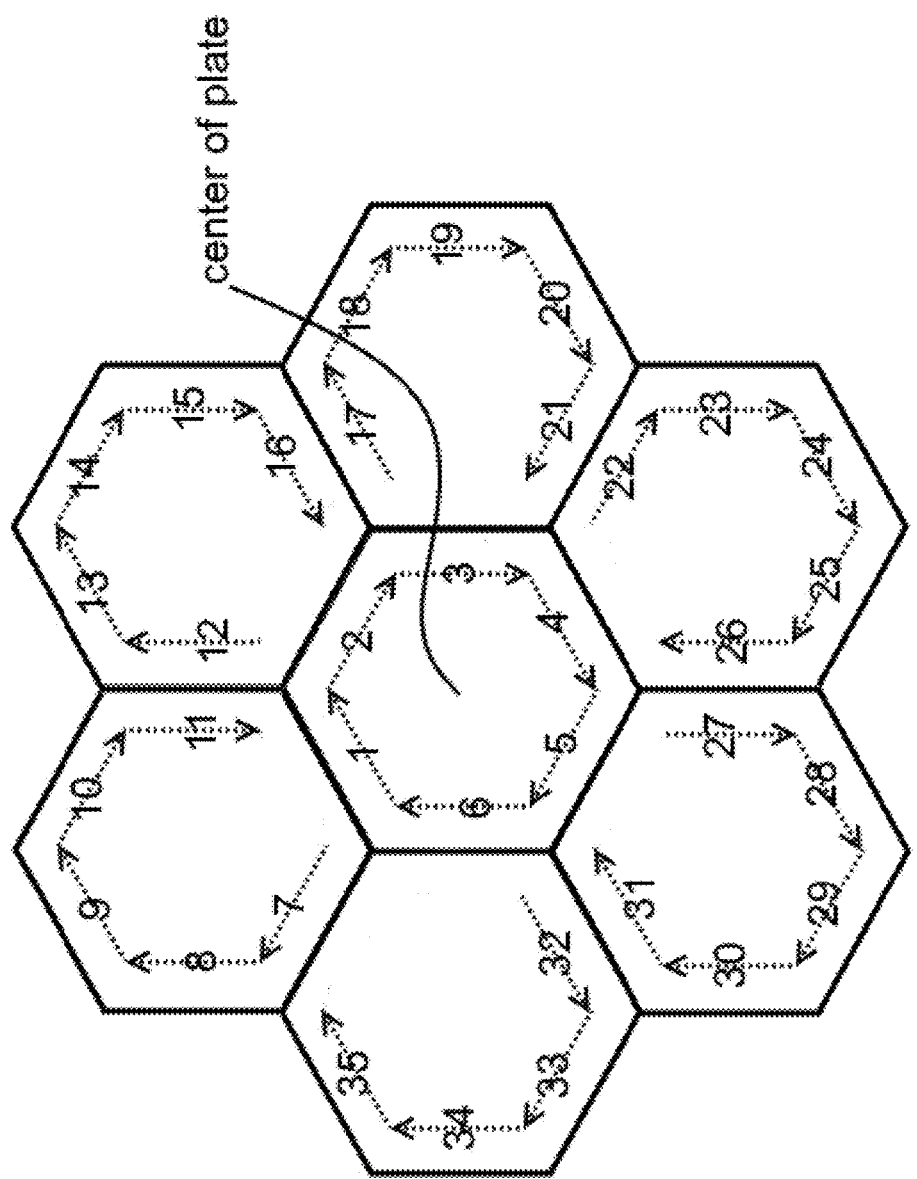
FIG. 3C is a plan view of the path taken by the laser of 3D printer in printing the instant Microchannel Plates, in accordance with the features of the present invention.

Other than the efforts to generally improve the speed and scale of objects that can be printed using the instant method, the inventors have discovered the optimal laser path for producing a layer of hexagonal channels 52 discussed below and shown in FIG. 3C. The optimal laser path is represented with the schematic in FIG. 3C, the laser movements numbered to show the sequential laser path used to create a layer of the instant MCPs. As can be seen in FIG. 3C, the optimal laser path for a single layer of the hexagonal channels draws each layer with minimal path repetition. For example, each hexagon is drawn having only one side gone over by the laser more than once.

Figure 8:
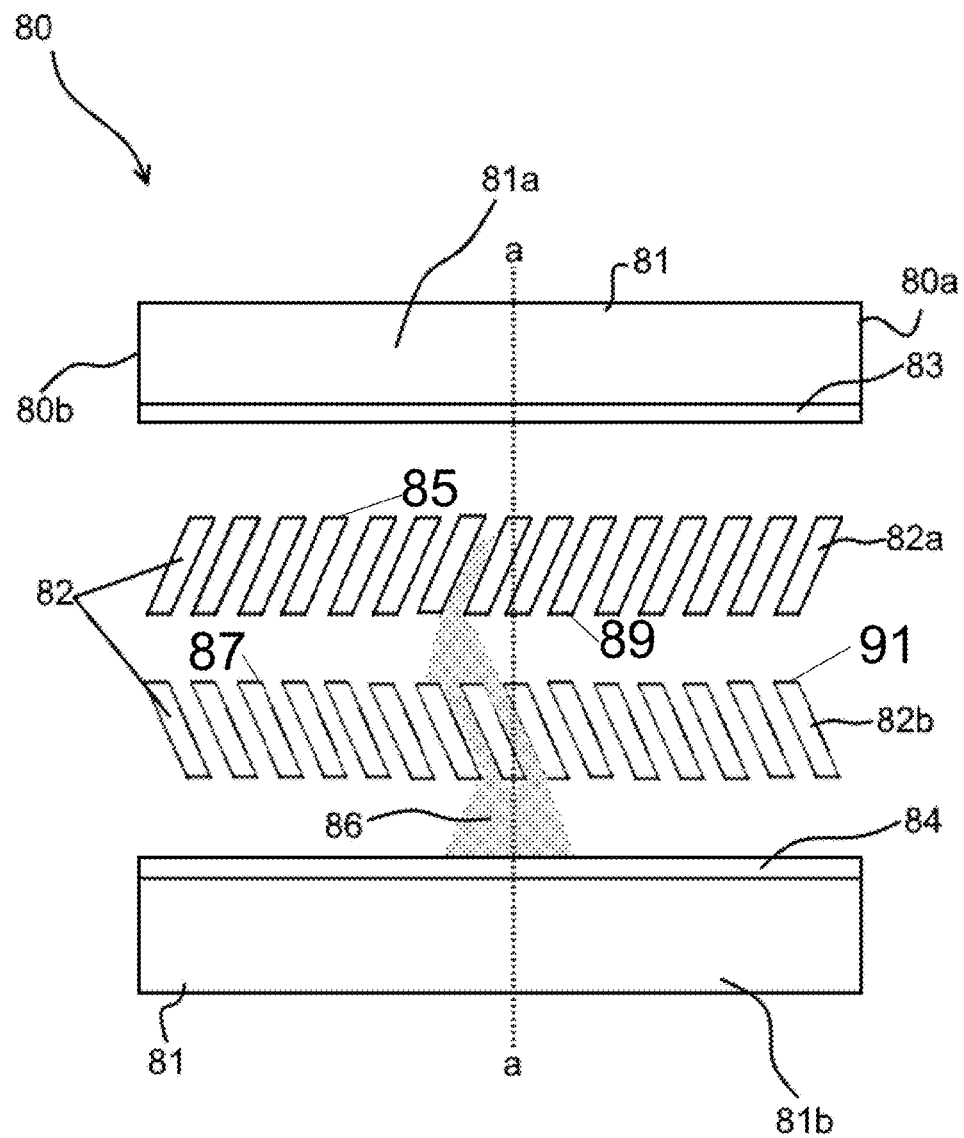
FIG. 8 is a simplified cross-section of a photodetector using the invented MCPs, in accordance with the features of the present invention.

Upon completion of MCP printing, the rough MCPs are dissolved from unreacted pre-polymer using a solvent such as PGMEA. Polymerization of the MCPs is then completed with UV lamp irradiation. The MCPs can then be functionalized as described herein. In a final step, the ends (85, 87, 89, and 91 as shown in FIG. 8) are polished.

Figure 6:
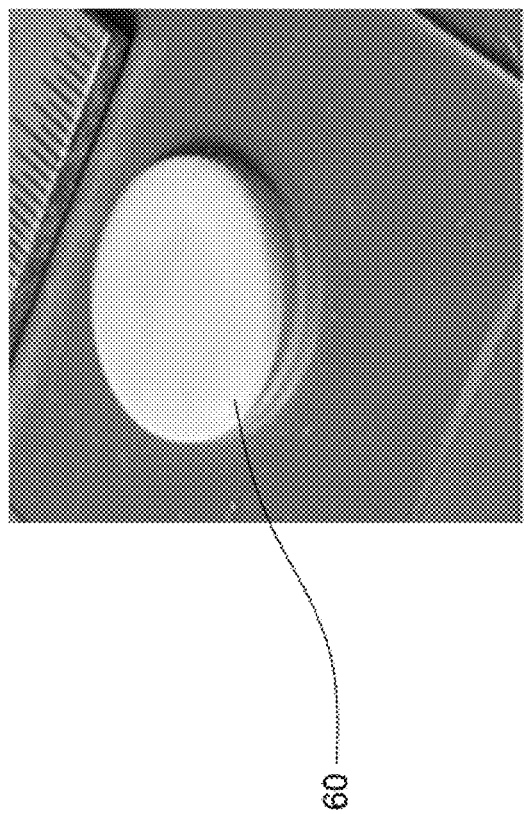
FIG. 6 is a photograph of a finished MCP prior to coating, in accordance with the features of the present invention.

Using the above-referenced method for printing MCPs, the instant invention has enabled the printing of MCP plates as pictured in FIG. 6. MCPs that are one cm in diameter and 1.2 mm thick can be printed via the invented method in approximately less than 24 hours, and typically between 18 and 24 hours. Previously, such MCPs took approximately 800 hours to produce the same plates. Compared to the cost of state-of-the-art glass MCPs, the instant MCPs can be produced at 100-1000 fold reduction in cost depending on the size of the plate. In an embodiment, the instant method can be used to print MCPs up to 100 cm in diameter and 3.6 mm thick in under 48 hours. The inventors envision that these sizes and times can be improved with the production of a customized printer with additional print heads and improved optics, i.e. using larger microscope objectives.

The instant printing method can be scaled to produce square meter scale plates in similar times using improved printers. These printers can use all reflecting microscope objectives whose size allows 100 times larger fields of view than the microscope objectives used in the commercial printer mentioned above while maximizing numerical aperture. This has the advantage of higher resolution with the highest vertical resolution. Using multiple laser beams also dramatically increases the printing speed. Additionally, an improved printer may use many lasers or a single more intense laser with an array of shutters.

Figure 4A:
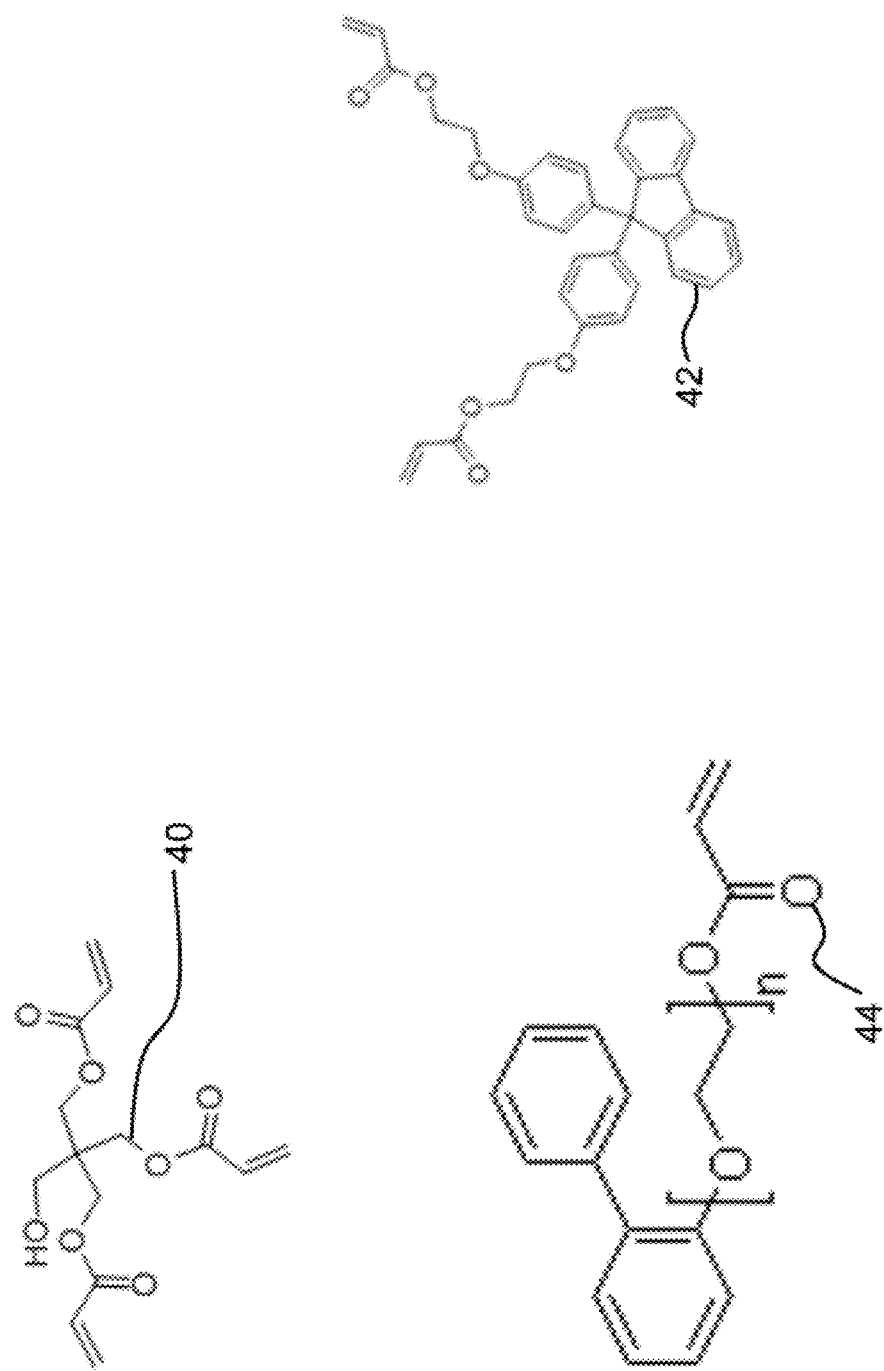
FIG. 4A depicts the chemical components of the photoresist used to print the invented MCPs, in accordance with the features of the present invention.

Any two photon pre-polymer photoresist can be used in the instant invention. An exemplary pre-polymer photoresist is IP Dip purchased from Nanoscribe GMBH of Eggenstein-Leopoldshafen, Germany. FIG. 4A shows the three components of Nanoscribe's IP Dip product: Pentaerythritol triacrylate 40 (60-80 wt %), 9,9-Bis[4-(2Acryloyloxyethoxy)phenyl]fluorene 42 (<24 wt %), and 2-(o-Phenylphenoxy)ethyl acrylate 44 (<24 wt %). This photoresist mixture is exemplary and not meant to be limiting. Suitable two photon pre-polymer photoresist typically comprise 50-80 wt % of a monomer that polymerizes with the application of light, 15-30 wt % of a catalyst to catalyze polymerization of the monomer, and a viscosity controlling moiety whose concentration is adjusted according to the amounts used of the monomer and catalyst. The inventors have discovered that the photoresist can be modified as is discussed, infra, in order to confer desired electrical or neutron reactive properties.

In alternative embodiments, additional moieties are added to the photoresist prepolymer mixture in order to confer additional functionality to the printed MCPs. For example, a resistive layer is added to the MCPs as discussed below to allow for a biasing voltage across the sides of an MCP to accelerate electrons along the length of channels. In an alternative embodiment, the photoresist used to print MCPs is doped with graphene oxide or any other inert, conductive material such that the printed MCP already has the desired resistive properties. Such an embodiment uses photoresist containing approximately 0.1-3 wt % graphene oxide, the percentage of the other components of the photoresist adjusted according to the amount of graphene oxide. Other inert, conductive materials may include nanoparticles, nanotubes, nanowires, nanoflakes or other suitably shaped nanomaterials composed of carbon, metal, metal oxide, metal nitride, or mixtures thereof.

Figure 4B:
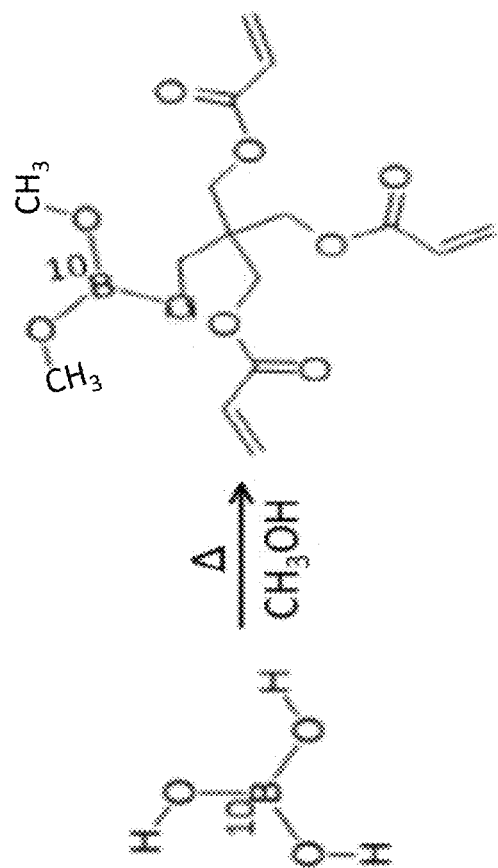
FIG. 4B depicts a chemical reaction between boric acid and a photoresist monomer in accordance with features of the present invention.

An important purpose of the instant MCPs is for use in neutron detectors relying on $^{10}B$. For use in such neutron detectors, the instant MCPs are printed using a $^{10}B$ doped photoresist such that the printed MCPs already incorporate the isotope. The photoresist can be doped in a number of ways to produce printed MCPs with sufficient $^{10}B$. An exemplary method is a reaction of boric acid ($^{10}BH_3O_3$) with the photoresist monomer (Pentaerythritol triacrylate) in methanol as shown in reaction 45 in FIG. 4B. The boric acid and methanol react to form trimethyl borate ($^{10}$B(O—CH$_3$)$_3$) that is soluble in the polymer, and the trimethyl borate reacts with the OH group in the polymer to form a new C—O—B bond. Alternatively, the $^{10}$BH$_3$O$_3$ and methanol can be replaced with pure $^{10}$B(O—CH$_3$)$_3$.

Figure 4C:
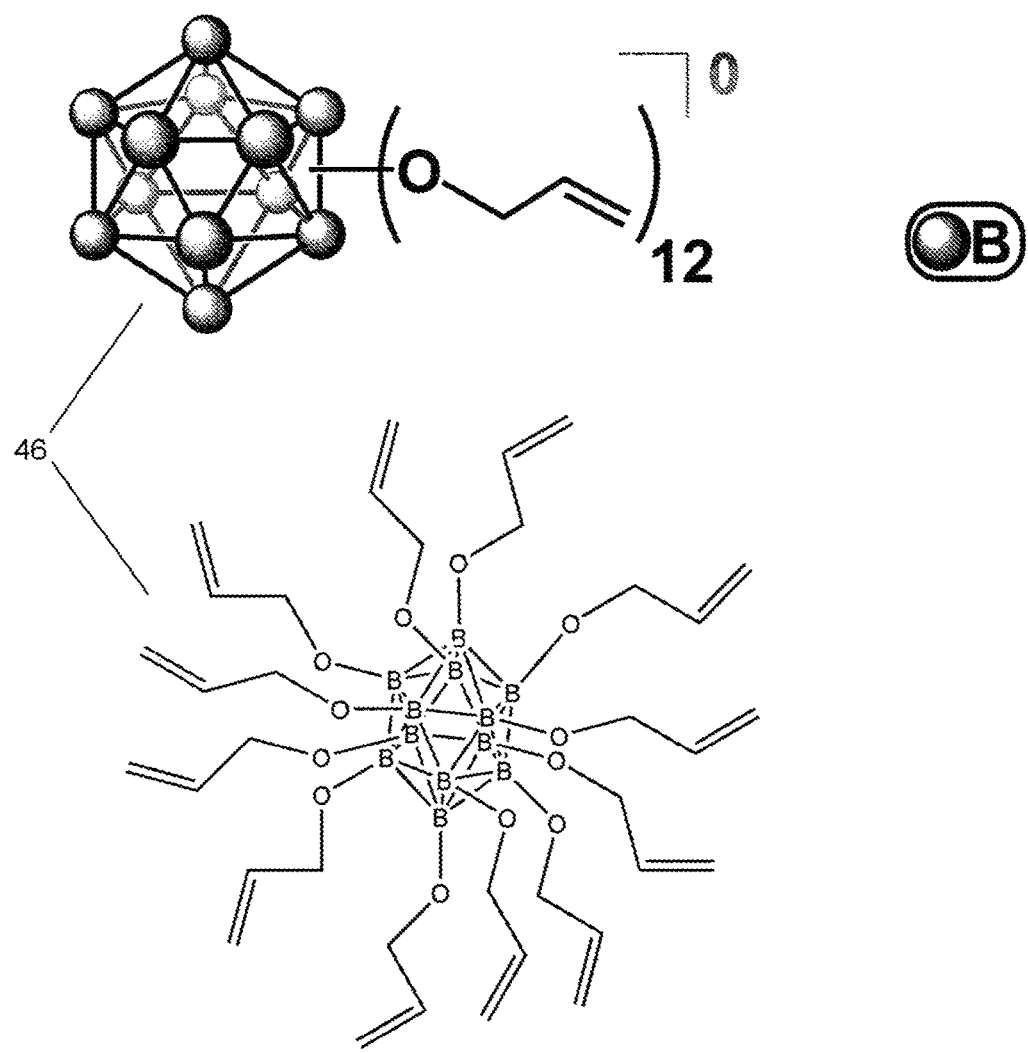
FIGS. 4C-E depict various chemical moieties that can be used to dope photoresist with $^{10}B$ isotope, in accordance with the features of the present invention
Figure 4D:
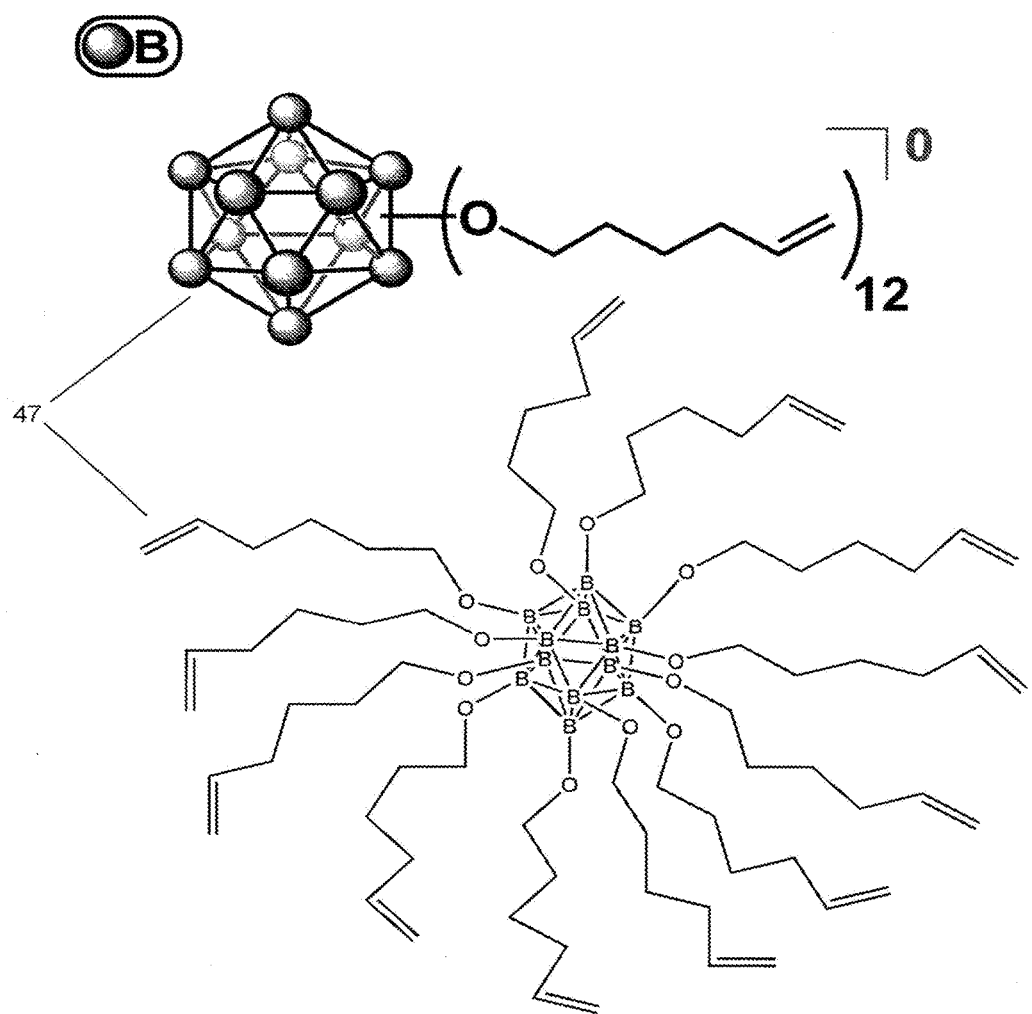
Figure 4E:
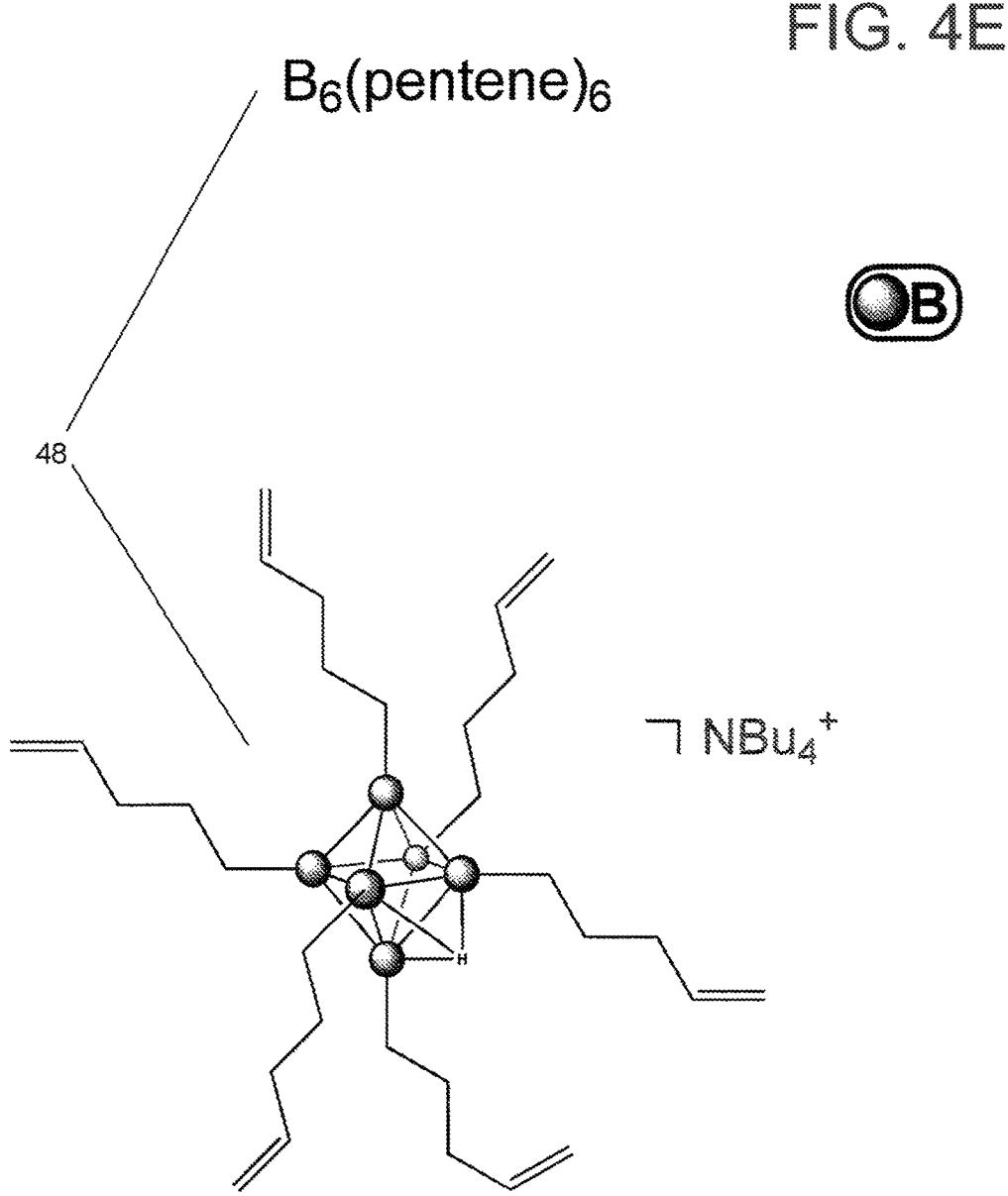

Another method is to add borated compounds to the pre-polymerized photoresist without reaction. Example compounds 46, 47, and 48 as shown in FIGS. 4C-E respectively use large complexes containing $^{10}$B polygons at their center. These large compounds are preferable for doping the photoresist with $^{10}$B compared to smaller compounds as smaller compounds such as triethyl boron reduce the polymerizability of the photoresist as the concentration of $^{10}$B rises. The necessary thickness of a MCP doped with $^{10}$B for use in a neutron detector is proportional to the percent $^{10}$B in the photoresist. For example, a 1 mm thick MCP would need to be approximately 50 wt % of the $^{10}$B compounds shown FIGS. 4C-E for use in an MCP. In an alternative embodiment, the photoresist pre-polymer is doped with $^{28}$Si instead of or in combination with $^{10}$B. Yet another method is to perform SIS using $^{10}$B(O—CH$_3$)$_3$ or another $^{10}$B precursor to infuse the polymer matrix with an inorganic compound containing $^{10}$B. Such SIS may be followed by ALD deposition of one or more of coatings comprising any of the $^{10}$B compounds described herein.

Micro Channel Plate Detail

Figure 5A:
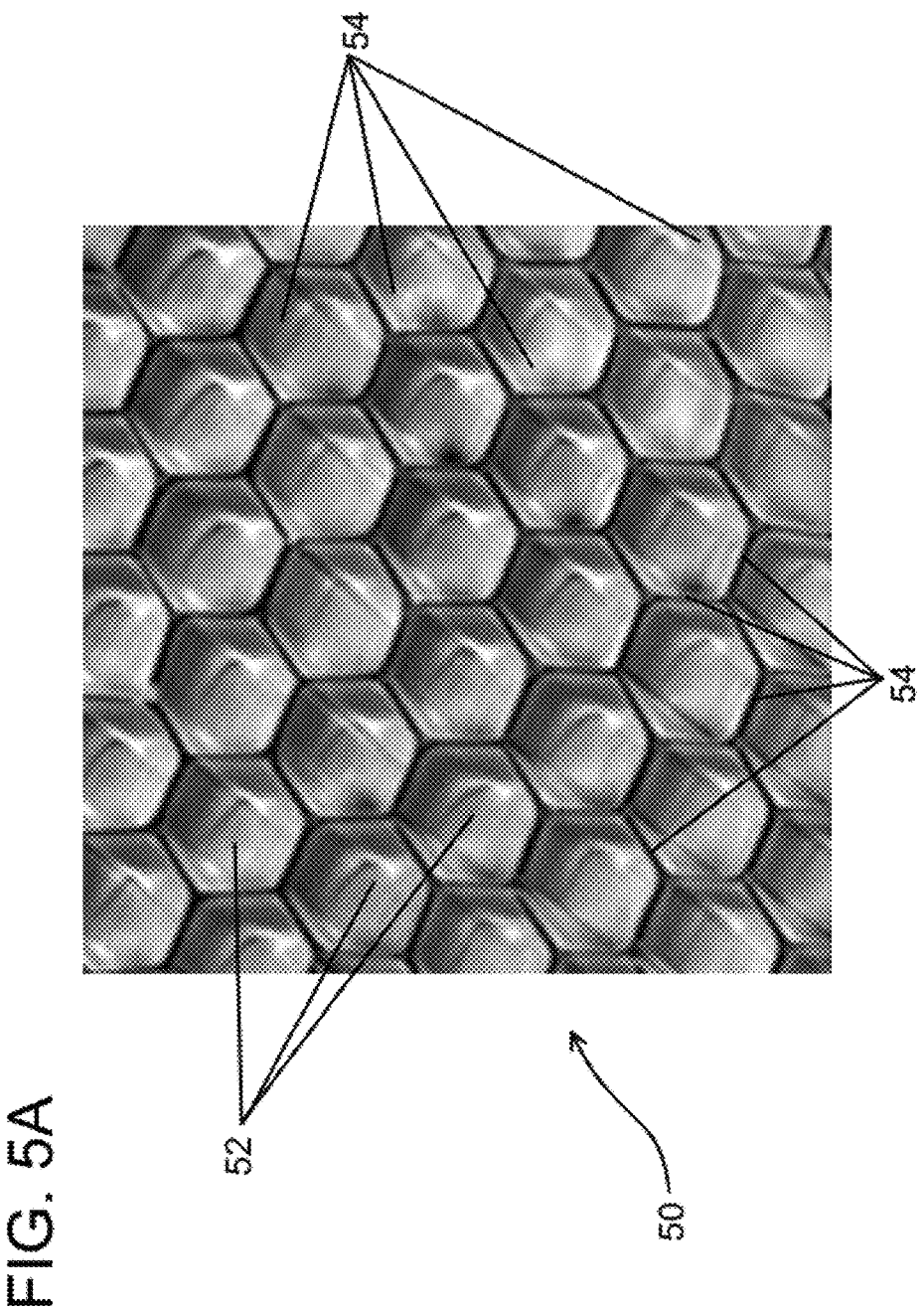
FIG. 5A is an SEM image of a printed MCP, in accordance with the features of the present invention.
Figure 5B:
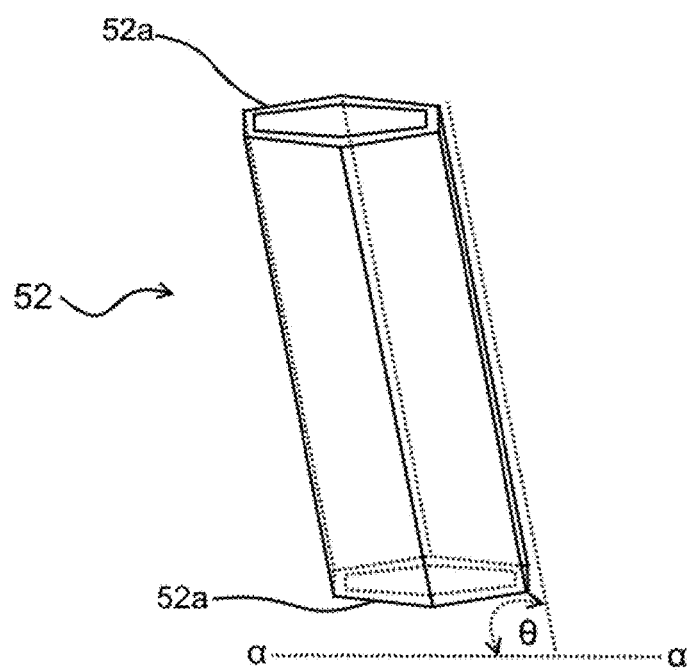
FIG. 5B is a schematic, perspective view of a single channel from a MCP, in accordance with the features of the present invention.

The instant invention uses the precision of 3D printing to create MCPs as shown in FIG. 5A. As shown in FIG. 5A, the MCP 50 defines longitudinally extending hexagonal channels 52, a shape not possible using previous MCP manufacturing methods. These hexagonal channels 52 provide MCPs with higher open area ratios when compared to prior art circular channels as shown in FIG. 1A. In an embodiment, the hexagonal channels are substantially straight. Alternatively, the channels 52 have a bias angle θ wherein the channel is angled with respect to the latitudinal axis a of the MCP 50, such that the angle is greater than 0 degrees and less than 90 degrees. This is demonstrated in FIG. 5B which shows a schematic of a single channel 52. Preferably, the bias angle θ is between approximately 0° and approximately 60°, more preferably between approximately 0° and approximately 40°, and typically between approximately 0° and approximately 30°. In FIG. 5B, the angle is depicted as approximately 85 degrees relative to the latitudinal axis. The channels 52 are defined by thin walls 54 of polymerized photoresist that are approximately 100 nm thick, thereby providing channels 52 that are approximately 10 μm in diameter.

The exemplary embodiment shown and described herein produces MCPs with hexagonal channels. However, the hexagonal shape is exemplary and not meant to be limiting. FIG. 3A-B's protocol can be used to produce MCPs of any shape and size having channels of any shape and size. The 3D printing protocol discussed and shown herein can be used to efficiently print any MCP with transversely extending channels of any regular or irregularly shape, or even a single MCP incorporating more than one channel shape at a time. In an embodiment, the MCP channels have a polygonal shape with four or more sides.

Using the 3D printing process described, supra, the instant MCPs are highly precise and superior in several respects to conventional glass MCPs. FIG. 6 shows a photograph of a finished MCP 60. In an embodiment, the produced MCPs are highly flat where produced MCPs have been empirically measured to have flatness error of less than 1 μm. Further, the MCPs 60 have significantly higher open area ratios when compared to conventional class MCPs. In an embodiment, the produced MCPs preferably have open area ratios more than approximately 80%, preferably more than approximately 90%, and typically more than approximately 95%. These large open areas facilitate a high probability that a particle incident on the produced MCP will enter one of the channels as shown in FIG. 5B as desired. These are highly desired properties for MCPs that are then used as radiation multiplying portions of various devices once the MCPs are functionalized. Also, the instant MCPs provide approximately $10^4$ gain with 1.2 mm thick plates, a 10-fold improvement over the prior art. Additionally, gain improves to more than $10^7$ when the MCPs are printed to 2.4 mm thick.

A salient feature of the invention is that the printed MCPs can be completely customized. As stated above, the invented MCPs can be printed having walls 54 that are approximately 100 nm thick. Such thin walls and therefore large channels and high open area ratios are preferable for use in gain applications. Where the instant MCPs are used in neutron detecting configurations, the channels are printed to approximately 1 μm thickness.

In an embodiment, the MCPs can define channels of any shape and bias angle. The instant MCPs are shown and described as hexagonal. However, the channels can also be square, rectangular, or circular. Additionally, the channels can be printed having any bias angle or with multiple bias angles (i.e. the bias angle changes at a point along a channel's longitudinal axis). Similarly, the instant method can be used to print channels that change shape along their longitudinal length, or form a corkscrew pattern. The channels can be printed to have different shapes at different spatial locations across the MCP, and the MCP can be printed flat or curved.

Functionalization of MCP for Electron Multiplication Detail

FIGS. 5A and 6 depict MCPs that are produced in the instant invention before the MCPs are modified for use. For use as a traditional electron multiplier or neutron detector, the MCPs are first functionalized so that the channels have the proper electronic properties. These properties are conferred by applying coatings to the ends (52a in FIGS. 5B and 5C) and interior surface 54 of the channels. A coated channel 70 is depicted in FIG. 7A.

Figure 5C:
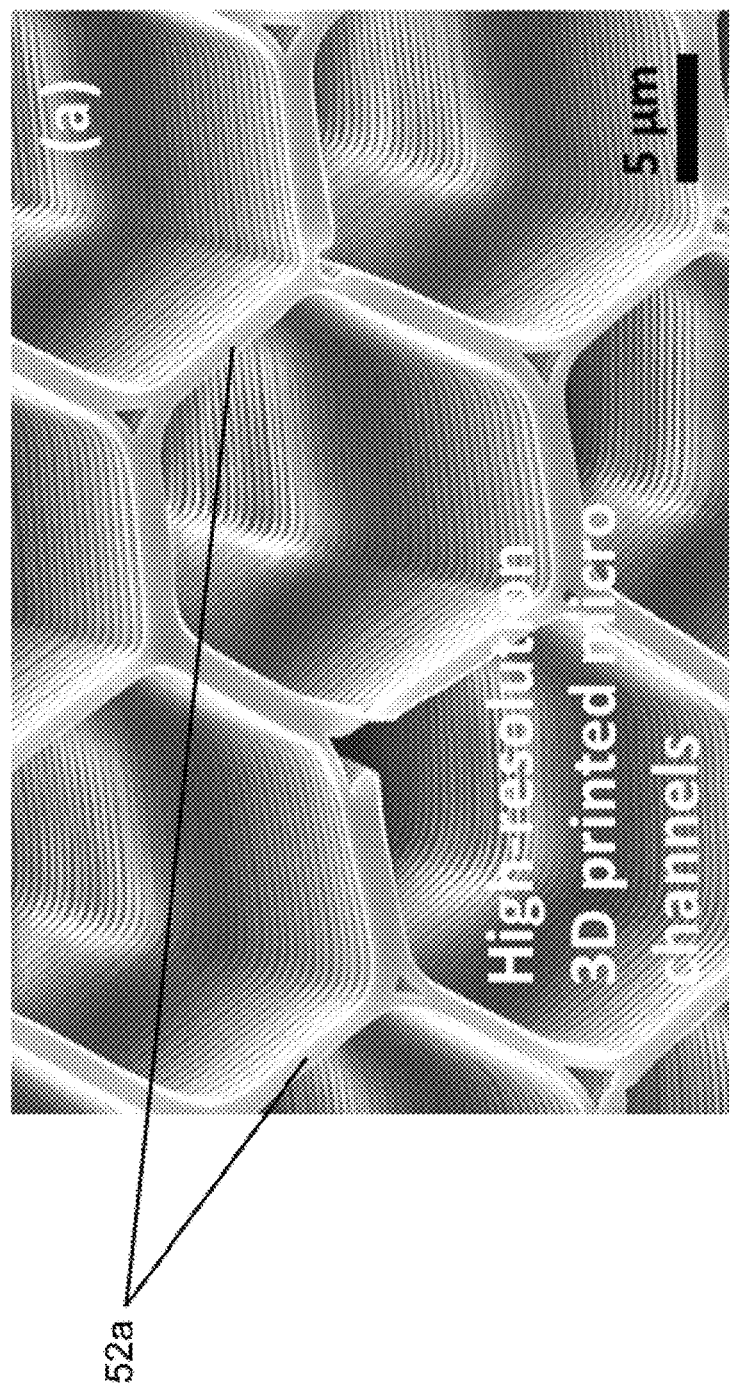
FIG. 5C depicts an SEM image showing the detail of the ends of a printed MCP, in accordance with the features of the instant invention.

Both ends 52a of the channels 52 are coated with a conductive material 72 so that the coated ends 52a, b (wherein 52a designates the upstream end and 52b designates a downstream end) serve as electrodes for the application of a voltage difference across the channels 52. Any material sufficiently conductive to serve as an electrode when deposited as a film is suitable for the conductive material to coat the ends. Exemplary materials include gold, platinum, palladium, copper, nichrome, and combinations thereof. The electrode material can be deposited via any suitable means for depositing conductive thin films that is line-of-site. This line-of-site requirement ensures that the electrodes penetrate a fixed depth of approximately one pore diameter into the pores to provide adequate electrical contact with the resistive pore wall, but do not extend so far as to create an electrical short through the pores. Exemplary line-of-site deposition processes for the electrode material include thermal evaporation, electron beam evaporation, and sputtering. As shown in FIG. 5C, the ends 52a, b of the channels make up an unbroken grid. Thus, a voltage applied to any portion of the electrode coating 72 on one end 52a of the channels distributes charge across all of the electrode coating 72 on that one end of an assembled MCP.

The interior surface 54 of the channels 52 also receive a plurality of coatings to facilitate electron multiplication. Prior to applying these coatings, surface pores in the interior surface 54 can be sealed using SIS. For instance, 25 cycles of SIS $Al_2O_3$ can be performed to accomplish the sealing. A tunable resistive coating 74 is first applied to a thickness between approximately 1 nm and approximately 1000 nm on the interior walls of the channels 52. This coating facilitates a bias voltage across the channels 52 when a voltage is applied to electrodes on the ends 52a of the channels. In an embodiment, the resistive coating is made from a combination of alumina ($Al_2O_3$) and tungsten, and is applied via atomic layer deposition (ALD). For instance, tunable resistive coating 74 can be a 50 nm film prepared using a W:$Al_2O_3$ ratio of 33% where the ALD cycles are executed as: W—$Al_2O_3$—$Al_2O_3$—W—$Al_2O_3$—$Al_2O_3$ ... to provide an MCP resistance of $2.3 \times 10^9$ Ohms. The resistance of the MCP can be tuned to any desired value by adjusting the W:$Al_2O_3$ ratio and thickness during the growth of the tunable resistive coating 74. FIG. 7B depicts a MCP channel 52 having an ALD coating 77 on its interior surface. This coating is composed of a resistive coating 74 and a secondary electron emissive coating 76. Alternatively, graphene oxide or any suitable inert, conductive material can be mixed with the photoresist polymer prior to 3D printing, and in this case the resistive coating 74 can be eliminated. A secondary emission layer 76 (FIG. 7A) comprising $Al_2O_3$, MgO, or another material with a high secondary electron emission coefficient is then deposited to a thickness between approximately 1 nm and approximately 100 nm on the resistive layer, for example via ALD. For instance, secondary emission layer 76 can be an ALD $Al_2O_3$ film with a thickness of 10 nm prepared using 75 ALD $Al_2O_3$ cycles. In an electron multiplication configuration, it is this secondary emission layer that releases electrons when struck by an initial electron when there is a voltage applied across the channels 52. After application of the coatings, functionalized MCPs can be assembled into a detector apparatus as shown in FIG. 8.

The tunable resistance coating 74 and the secondary electron emissive coating 76 can be deposited by any suitable method that results in uniform, precise and conformal coatings such as ALD.

To prevent unwanted chemical vapor deposition (CVD) during the atomic layer deposition (ALD) coating of the resistive coating 74 and the emissive coating 76, the pores of the porous polymer surface 54 can first be sealed using sequential infiltration synthesis (SIS). An exemplary SIS reaction is shown in FIG. 7C. That figure uses the polymer pentaerythritol triacrylate (40 from FIG. 4A) as an exemplary starting polymer, but any polymer with suitable functional groups such as the carbonyl (C=O) groups 200 will facilitate the SIS. In step 1 of the SIS, the polymer 40 is exposed to trimethyl aluminum (TMA) vapor 201, and the TMA reacts with a fraction of the carbonyl groups 200 to form a new O—Al bond to the chemisorbed dimethyl aluminum (DMA) 202, and the third methyl ($CH_3$) group 203 bonds to the carbon of the carbonyl 200. In step 2, the polymer is exposed to $H_2O$ vapor 204 which reacts with the DMA to form hydroxyl (OH) groups 205. This TMA-H2O process can be repeated multiple times to develop $Al_2O_3$ clusters inside of the near surface region of the MCP to densify the polymer and seal the pores. Consequently, the ALD resistive coating 74 and emissive coating 76 will grow only on the outer surface of the polymer, and CVD will be avoided.

Further detail of the SIS and ALD procedures used to functionalize the invented MCPs are presented in one of the prior patents to the inventors, U.S. Pat. No. 9,139,905, the entirety of which is incorporated by reference herein.

Photodetector Detail

FIG. 8 depicts a cross section of a photodetector 80 utilizing two functionalized MCPs 82a, b. The functional elements of the detector 80 are positioned between two windows 81 that allow for the passage of light and may be glass, quartz or sapphire, a superior window 81a and an inferior window 81b. The superior window 81a is positioned superior to and in contact with a photocathode 83. A first functionalized MCP 82a is positioned inferior to the photocathode 83 and superior to and spaced away from the second functionalized MCP 82b along the longitudinal axis line a-a of the detector 80. As discussed above, the instant MCPs may be produced as to have a bias angle. In the photodetector 80, the first functionalized MCP 82a is positioned such that its channels are biased towards the photodetector's first end 80a. The second functionalized MCP 82b is positioned so that its channels are biased toward the second end 80b of the photodetector 80b. A bias may be applied between the two MCPs to accelerate electrons across the gap between the MCPs. This so-called chevron configuration increases the probability that electrons leaving the first MCP 82a will collide with the walls of the channels within the second MCP 82b while minimizing ion feedback. The depending end of the photodetector is defined by detecting means 84 underlying (and therefore downstream of) the MCPs 82. The detecting means 84 overlays the depending window 81b. Suitable detecting means are a metal film d to collect and integrate the total charge emitted from the MCPs 82, a phosphor screen to convert collected electrons into an optical pattern that can be recorded on a camera. Alternatively, the detecting means can be a segmented anode such as a series of discrete metal strips or crossed delay lines.

There is a space between photocathode 83 and the superior MCP 82a and a bias across this space may be applied to accelerate the photoelectrons to increase detection efficiency. Finally, there is a space between the MCPs and the collector of electrons (detector 84) on the back such as a phosphor screen. Again, a bias may be applied between the second MCP 82b and the detector 84 for electron acceleration. Photodetectors can also be fabricated using one, two, three, or more MCPs 82 where each additional MCP provides an additional gain factor of 1000.

In an embodiment where the two MCPs 82a and 82b may be printed together with a conducting layer between to provide a precise registry between the pores of the two plates.

In use, when light A hits the negatively charged photocathode 83, it ejects an electron. An electron ejected from the photocathode 83 then collides with the interior of one of the channels of the first MCP 82a. As the MCPs are functionalized as shown in FIG. 7 and described above, the channel of the first MCP 82a ejects additional electrons upon collision with the first electron. These electrons then continue toward the detecting means, colliding into the channel walls of the MCPs additional times along the way. With each collision between an electron and the walls of an MCP channel, additional electrons are ejected. In this way, the MCPs multiply electrons ejected from the photocathode 83. The path and multiplication of the electrons through the MCPs is represented by the stippled element labeled element 86.

In the photodetector configuration, each MCP has a bias applied across it such that that the superior ends (85, 87) of the MCPs are up to 1.5 kV more positive than the depending ends (89, 91). The detector, 84 is 50-200 V more positive than the depending end 91 of the second MCP 82b. Typically, the superior end 87 of the second MCP 82b is between 0-200 V more positive than the depending end 89 of the first plate. In this configuration, the photocathode is biased at approximately −2500 V which is a few hundred volts more negative than the superior end 85 of the first MCP 82a.

In a neutron detecting configuration, there is no photocathode and the superior end 85 of the first MCP 82a is approximately −2200 V. In the photodetector or other electron detecting configuration, the superior end 85 of the first MCP is biased at approximately −2000 V with the anode (detector 84) at approximately 4000 V.

Figure 9:
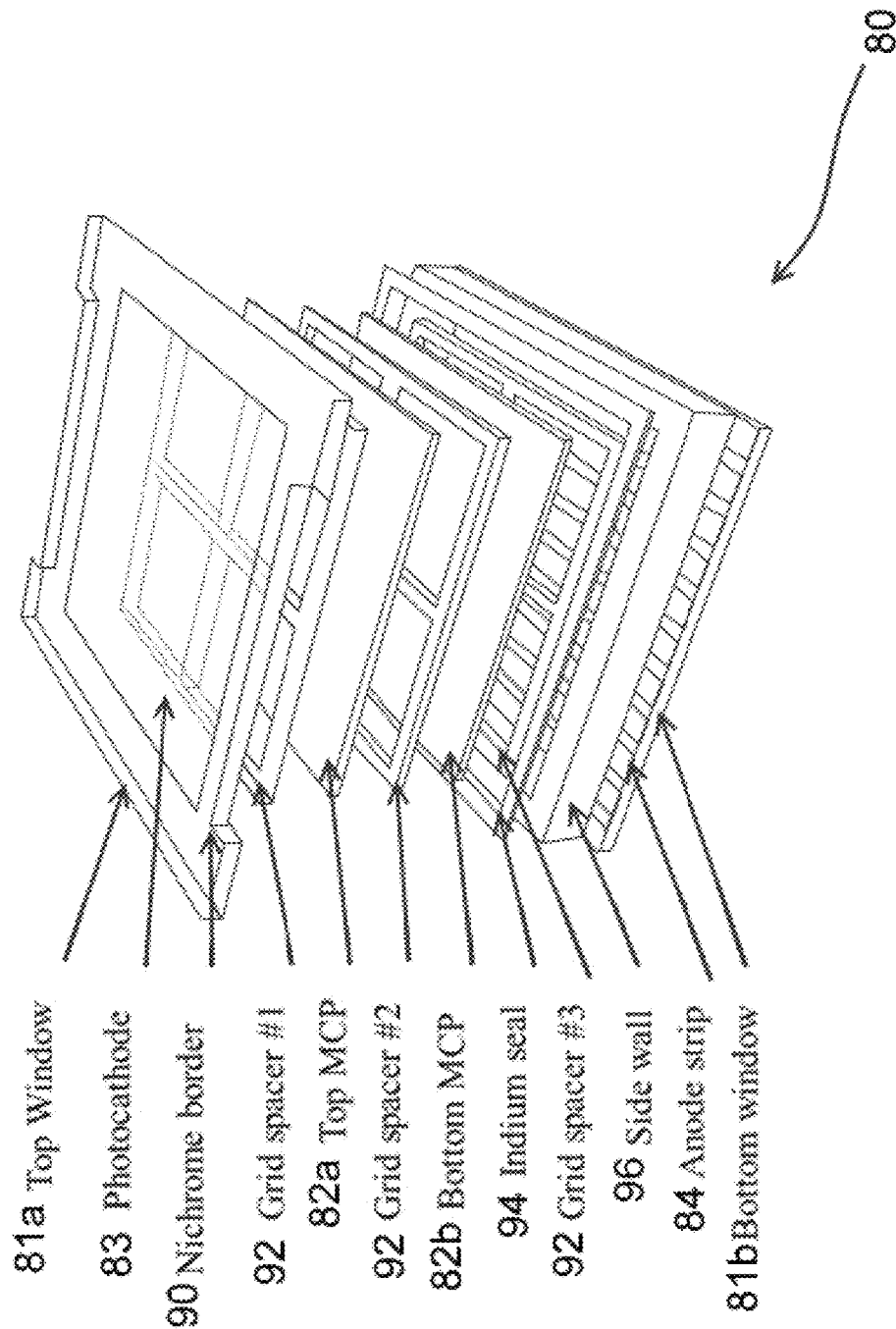
FIG. 9 is an exploded view of the components used in a photodetector using the instant MCPs, in accordance with the features of the present invention.
Figure 10:
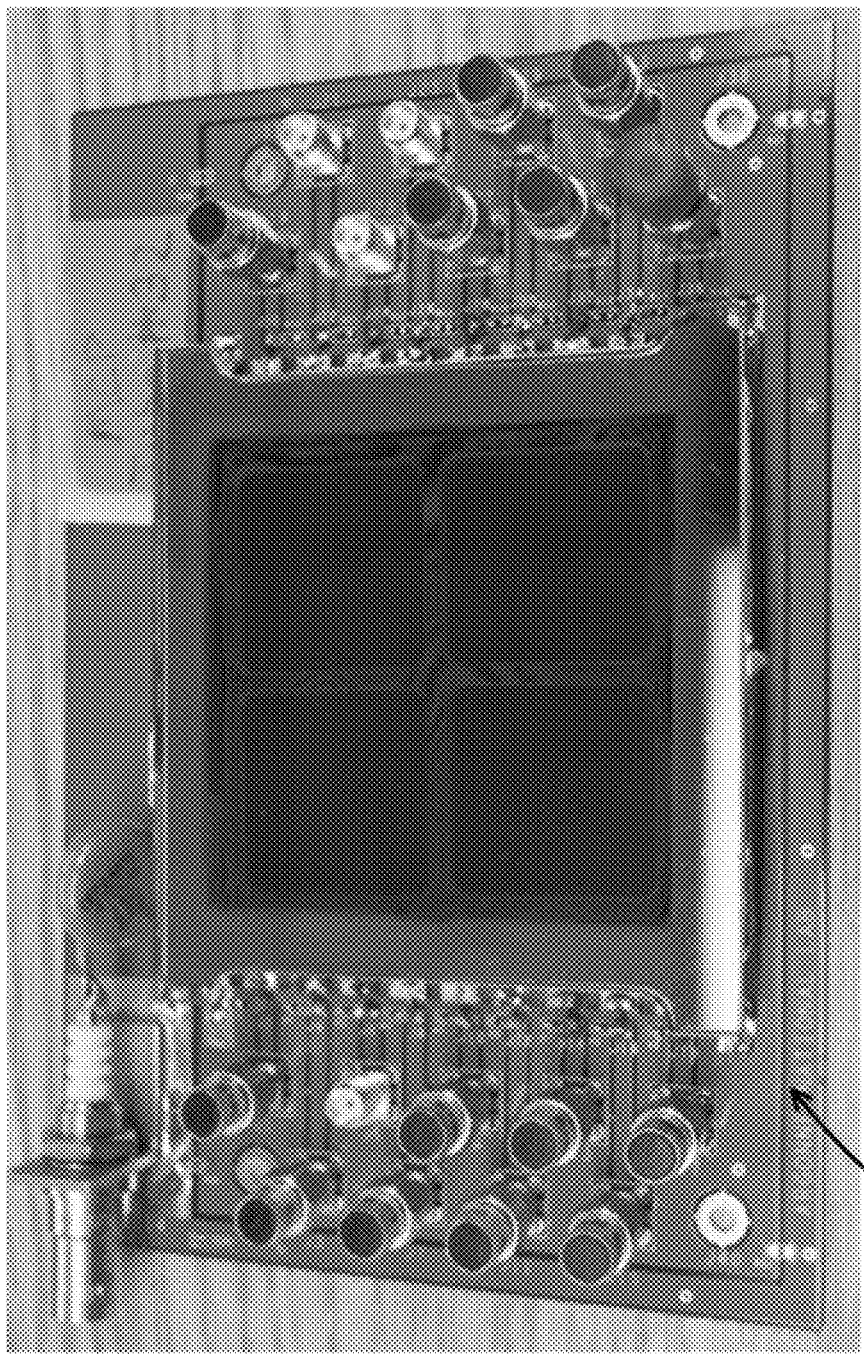
FIG. 10 is a photograph of an assembled photodetector that uses the instant MCPs, in accordance with the features of the present invention.
Figure 11:
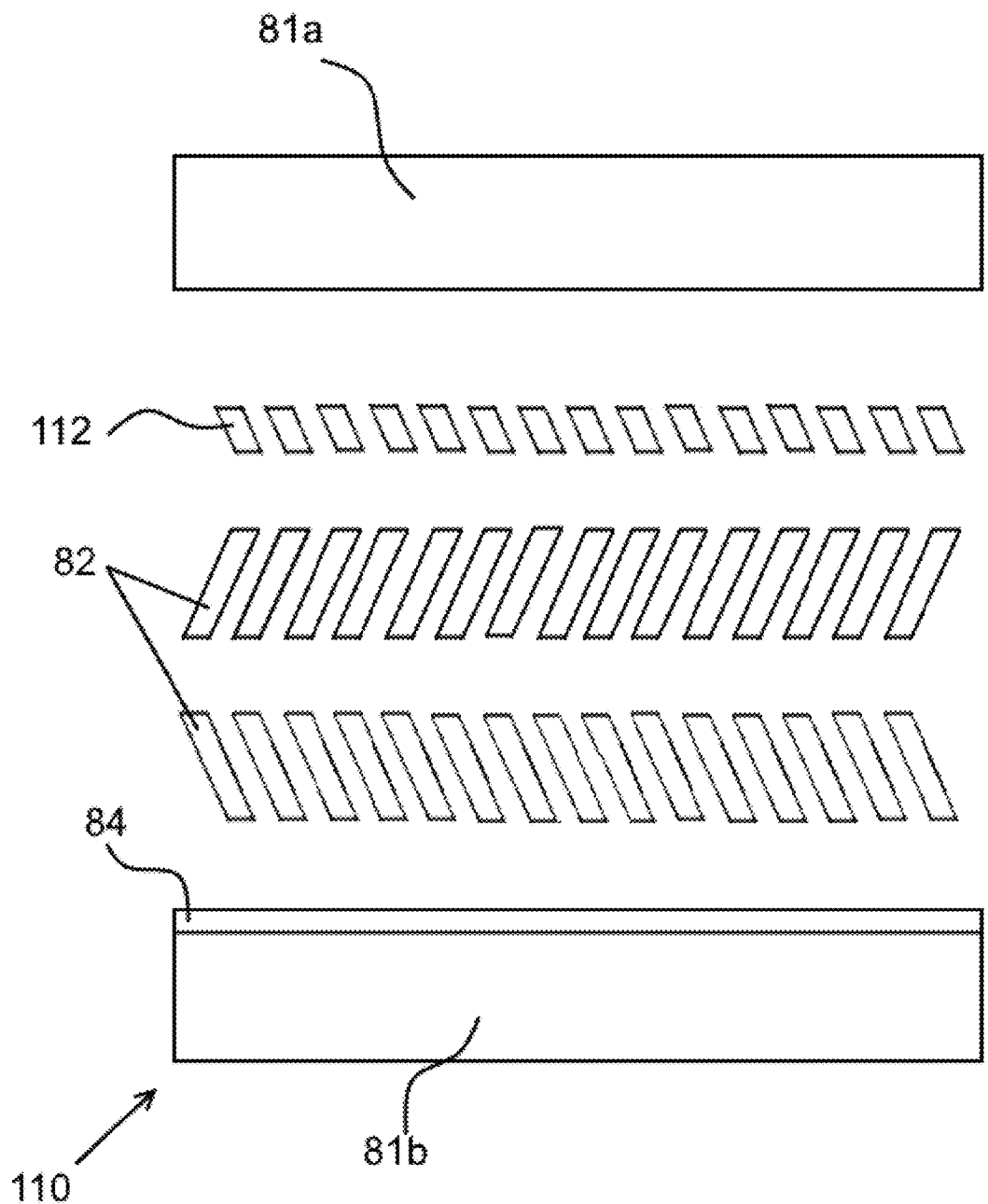
FIG. 11 is a simplified cross-section of a neutron detector using the instant MCPs, in accordance with the features of the present invention.

FIG. 9 depicts an exploded view of the complete configuration of the photodetector 80 shown in simplified cross section in FIG. 8. In FIG. 9, the periphery of the photocathode 83 is surrounded by a continuous conductive border 90 so that the cathode can be charged. Additionally, when fully assembled, the photodetector 80 uses three grid spacers 92, one between the photocathode and the first MCP 82a, one between the two MCPs, and one between the second MCP 82b and a sealing member 94, that sealing member 94 positioned between the detecting means and the second MCP 82b. Also shown in FIG. 9 is the sidewall 96 that contains all components inferior to the photocathode and superior to the detecting means when the photodetector is assembled as shown in FIG. 10.

Where the instant MCPs are printed to contain $^{10}$B as discussed above, the design of the detector shown in FIG. 8 is easily modified to detect neutrons instead of photons. Alternatively, the MCPs can be printed to contain $^{157}$Gd, or any element with a high cross section for neutron capture. A simplified cross section of such a detector 110 is shown in FIG. 11. In this detector, a third MCP 112 is added superior to the two 82 shown in FIG. 8. This third MCP 112 is doped with $^{10}$B as discussed above and is thinner than the other two (82) MCPs in the detector. In an embodiment, the third MCP 112 is between 10 and 100 μm in thickness. In this detector 110, the photocathode 83 is removed such that a window 81 is the most superior layer.

In the neutron detector configuration, the $^{10}$B doped MCP 112 will produce electrons upon incidence of a neutron according to the Equation 1 with a Q value of 2.31 MeV, a α kinetic energy of approximately 1.470 MeV, and a γ energy of approximately 0.48 MeV:

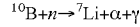

$$^{10}B+n\rightarrow{}^{7}Li+\alpha+\gamma \qquad \text{Eq. 1}$$

According to Equation 1, using the detector shown in FIG. 11, a neutron incident on the doped MCP 112 will eject an electron that will then be multiplied as shown in FIG. 8.

In an embodiment, the detectors described above are assembled entirely through 3D printing. The functionalizing elements of the MCPs discussed above, may be printed simultaneous with the MCP itself as well as the other elements shown in FIGS. 8-11.

In another embodiment, the neutron sensitivity can be imparted by coating the MCP polymer structure with a coating or film containing $^{10}$B. This coating can be deposited by ALD using $^{10}$B-doped precursor. Other methods include a solution-phase sol-gel process, CVD, electrodeposition of a conducting $^{10}$B-containing film, electorless deposition, and combinations thereof.

EXAMPLES

Two MCPs were printed according to the instant method, each having a diameter of 1 cm and a thickness between 0.7 and 0.9 mm. Both samples were functionalized with the deposition of a gold electrode via thermal evaporation on the ends of the hexagonal channels as shown in FIG. 7A. The pores in the interior of the hexagonal channels were then sealed using SIS of $Al_2O_3$ as shown in FIG. 7C with 25 SIS $Al_2O_3$ cycles at 175° C. The interiors of the channels were then coated with a resistive coating and secondary emission coating as shown in FIG. 7A. The tunable resistive coating comprising a nanocomposite of $Al_2O_3$ and tungsten with a thickness of 50 nm prepared using a W:$Al_2O_3$ cycle ratio of 33% at 175° C. was deposited using ALD. Finally, a secondary electron emissive coating of 10 nm $Al_2O_3$ prepared using 75 ALD $Al_2O_3$ cycles at 175° C. was applied to the resistive layer using ALD. The resulting MCP had a resistance of 2.3×109 Ohms. Gain production was then demonstrated on both of the functionalized MCPs.

Example 1

The second 3D printed, functionalized MCP was tested in a large vacuum phosphor screen equipped test chamber. In this test, ultraviolet light was used to illuminate the 3D printed, functionalized MCP directly which produced electrons that were multiplied in the 3D printed MCP. Additional gain was provided by use of a large 8"×8" MCP purchased from Incom, Inc. of Charlton Mass. that was functionalized via the ALD protocol discussed above used in the phosphor chamber such that electrons exiting the 3D printed MCP entered the larger MCP, were gain multiplied, and then imaged by a subsequent phosphor screen.

Figure 12:
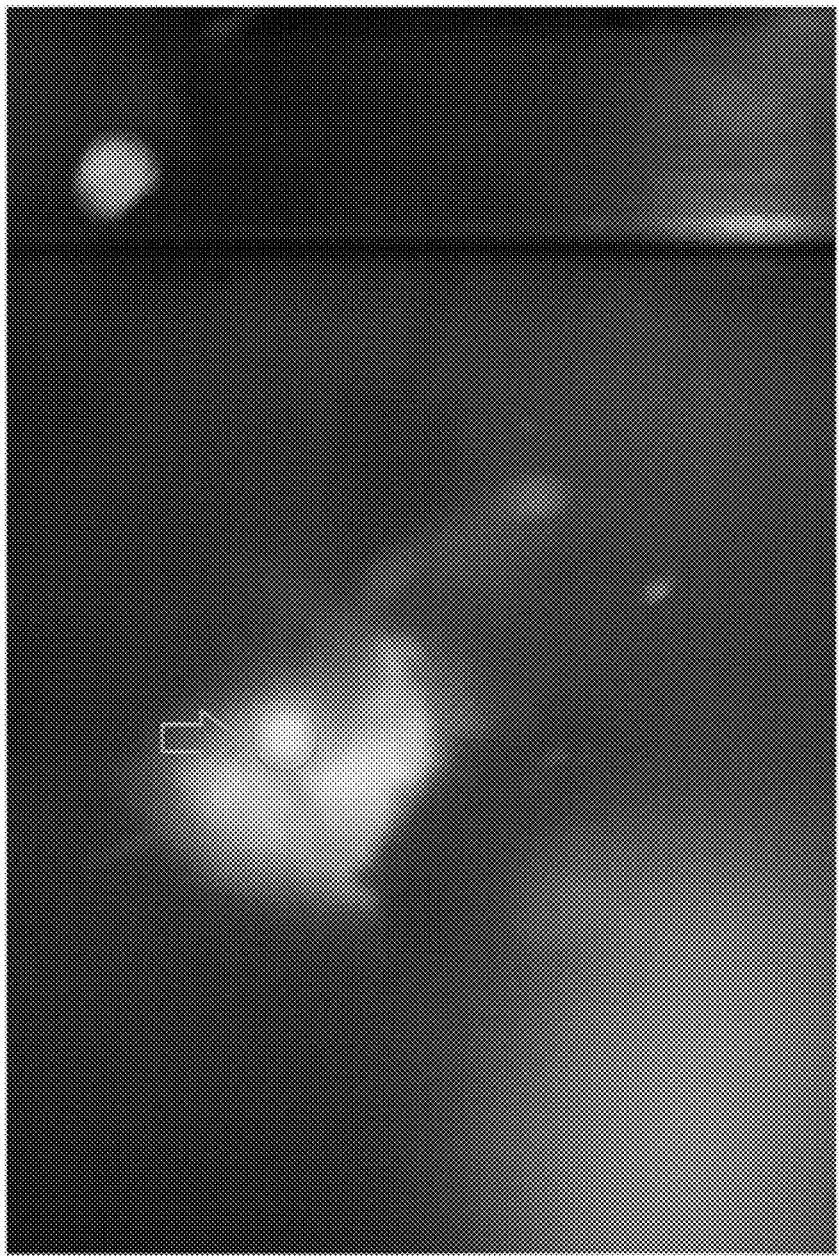
FIG. 12 depicts a phosphor screen image showing collision with an electron cloud that has been multiplied using an MCP, in accordance with the features of the present invention.

In FIG. 12, the circle indicates the location of the MCP in example 1. A mercury vapor lamp was used to produce UV light that liberated electrons from the gold electron of the functionalized MCP. A bias voltage of 1000V was applied across the 0.9 mm thickness of the MCP to accelerate the electrons through the MCP. The electrons struck the channels' walls as they traverse the MCP producing more electrons and hence gain production. Electrons exiting the MCP were further multiplied in a large MCP purchased from Incom, Inc. of Charlton Mass. that was functionalized via the ALD protocol discussed above directly downstream from the printed MCP with reference to the position of the UV light. The electron cloud exiting the large MCP strikes a phosphor screen producing the image shown. The halo surrounding the MCP image is thought to be produced by backscattered electrons from the large MCP.

Example 2

In a small vacuum test chamber, a 33 mm diameter MCP was used to produce electrons that were then multiplied in one of the 3D printed, functionalized MCPs. Evidence of gain production is in the form of an image of the multiplied electron cloud on a phosphor screen as shown in FIG. 12 and a measurement of the relative gain versus bias voltage applied to the MCP.

Figure 13:
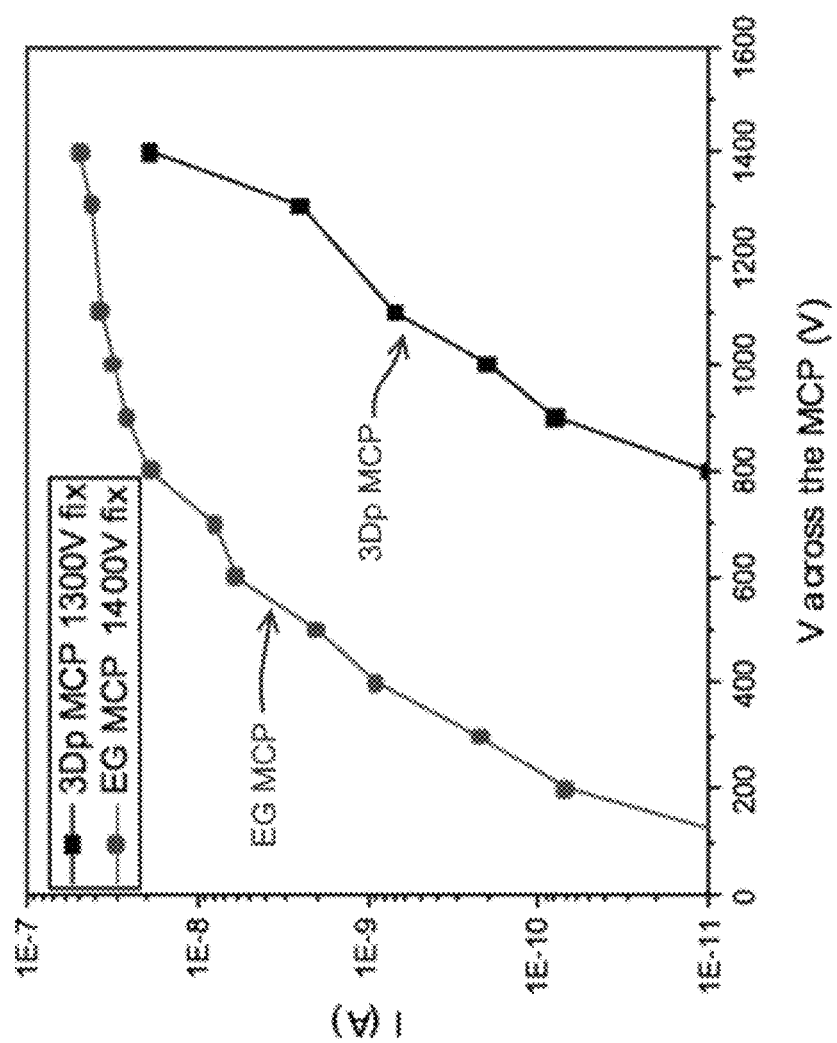
FIG. 13 depicts a plot of relative gain of a 3D printed MCP versus bias voltage applied to the MCP, according to the features of the present invention.

FIG. 13 shows the relative gain of a 3D printed MCP versus bias voltage applied to the MCP in Example 2. The top curve shows the electron current as the 3D printed MCP bias is varied with the standard MCP voltage held constant at 1400V. The bottom curve shows the current as the standard MCP voltage is varied with the 3D printed MCP bias voltage held at 1300V. The top curve shows the gain produced by the 3D printed MCP increasing by a factor of approximately 500 as the voltage increases from 200V to 1400V.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments.

In an embodiment, the invention comprises a gain device comprising a plurality of channels having a polygonal shape with four or more sides. The channels having a polygonal shape may comprise hexagonal channels. The polygonal shaped channels may extend transversely through the device so as to define a first channel end and a second channel end. The device may be at least 1.2 mm thick, and have a diameter that is at least one cm. The device has a latitudinal axis perpendicular to the thickness of the device and the channels having a polygonal shape extend at an angle of between 0° and approximately 30° relative to the latitudinal axis of the device. In this embodiment, the first and second ends of the channels may be coated with a conductive layer. The conductive layer may be made from gold, platinum, palladium, nichrome, copper, and combinations thereof. The polygonal channels may further comprise graphene oxide. The channels having a polygonal shape further comprise interior surfaces, wherein the interior surfaces are coated with a first resistive coating and a secondary electron emissive coating. The resistive coating comprises a combination of $Al_2O_3$ and tungsten, and wherein the secondary electron emissive coating is made from a material selected from the group consisting of $Al_2O_3$, MgO, and combinations thereof. The first coating is between 10 and 1000 nm thick and the second coating is between 1-100 nm thick. The device may comprise an open area ratio of at least 80 percent. The device provides $10^4$ gain. The device may be incorporated into an electron multiplication device comprising a source for electrons positioned superior to the device. The electron multiplication device may further comprise a second invented gain device positioned inferior to the first gain device.

In another embodiment, the invention provides a method for producing microchannel plates (MCPs) comprising providing a pre-polymer; and directing a laser over the pre-polymer in a pre-determined pattern. The pre-polymer may comprise a mixture of Pentaerythritol triacrylate, 9,9-Bis[4-(2Acryloyloxyethoxy)phenyl]fluorene, and 2-(o-Phenylphenoxy)ethyl acrylate (<24%). The method may produce an MCP with a diameter of at least one cm and a thickness of at least 1.2 mm. The invented method may take less than 24 hours to complete. In this embodiment, the produced MCP comprises a plurality of hexagonal channels. The method may further comprise coating terminating ends of the hexagonal channels with a conductive coating. In the method, the hexagonal channels may further comprise interior walls and the method further comprises depositing a first coating on the interior walls of the hexagonal channels and depositing a second coating on top of the first coating. The method may further comprise the steps of: depositing a resistive layer on an interior surface of the channels; and depositing a secondary electron emissive coating on the resistive layer. In the method, the resistive coating comprises a combination of $Al_2O_3$ and tungsten and the secondary electron emissive coating is made from a material selected from the group consisting of $Al_2O_3$, MgO, and combinations thereof. The method may further comprise the step of sealing pores in the interior surfaces of the channels before deposition of a resistive layer. In this embodiment of the invention, the pores in the interior surfaces of the channels are sealed with $Al_2O_3$.

Another embodiment of the invention provides a method for efficiently 3D printing an object comprising: a) providing a pre-polymer into a sample holder; b) directing a laser over the pre-polymer in a predetermined pattern to create a layer of an object having a height, H; c) raising the sample holder along a latitudinal axis through the center of the layer by a distance equal to H; d) directing the laser over the pre-polymer in the predetermined pattern; e) repeating steps a)-d) until the object has a first predetermined area and a predetermined second height; f) resetting the position of the sample holder; g) moving the sample holder along a latitudinal axis of the layer a predetermined distance; h) repeating steps a)-g) until the object has a final area; i) resetting the position of the sample holder; j) raising the sample holder along a latitudinal axis through the center of the layer by a distance of the predetermined second height plus H; and k) repeating steps a)-j) until the object has a final area and final height.

Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiments of the invention in which an exclusive property or privilege is claimed is defined as follows:

1. A method for producing microchannel plates comprising:
   a) providing a pre-polymer; and
   b) directing a laser over the pre-polymer into a predetermined pattern to generate a microchannel plate comprising a plurality of channels, wherein the microchannel plate has an open area ratio of at least 80 percent.

2. The method of claim 1 wherein the microchannel plate has a diameter of at least one cm and a thickness of at least 1.2 mm.

3. The method of claim 2 wherein the method takes less than 24 hours to complete.

4. The method of claim 1 wherein the channels are hexagonal.

5. The method of claim 4 wherein the method further comprises coating terminating ends of the hexagonal channels with a conductive coating.

6. The method of claim 5 wherein the hexagonal channels further comprise an interior surface, and wherein the method further comprises:
   c) depositing a resistive layer on the interior surface of the channels; and
   d) depositing a secondary electron emissive coating on the resistive layer.

7. The method of claim 6 wherein the resistive coating comprises a combination of $Al_2O_3$ and tungsten and the secondary electron emissive coating is made from a material selected from the group consisting of $Al_2O_3$, MgO, and combinations thereof.

8. A method for efficiently 3D printing an object comprising:
   a) providing a pre-polymer into a sample holder;
   b) directing a laser over the pre-polymer in a predetermined pattern to create a layer of an object having a height, H;
   c) raising the sample holder a distance equal to H along a latitudinal axis that is parallel to the height of the object and runs through the center of the layer;
   d) directing the laser over the pre-polymer in the predetermined pattern;
   e) repeating steps a)-d) until the object has a first predetermined area and a predetermined second height;
   f) resetting the position of the sample holder;
   g) moving the sample holder along a latitudinal axis of the layer a predetermined distance;
   h) repeating steps a)-g) until the object has a final area;
   i) resetting the position of the sample holder;
   j) raising the sample holder by a distance of the predetermined second height plus H along its latitudinal axis; and
   k) repeating steps a)-j) until the object has a final area and final height.

* * * * *